US012669774B2

(12) United States Patent
Wang

(10) Patent No.: US 12,669,774 B2
(45) Date of Patent: Jun. 30, 2026

(54) POWER RECEIVING UNIT AND PROCESSING CARTRIDGE

(71) Applicant: Weina Wang, Zhuhai (CN)

(72) Inventor: Weina Wang, Zhuhai (CN)

( * ) Notice: Subject to any disclaimer, the term of this patent is extended or adjusted under 35 U.S.C. 154(b) by 0 days.

(21) Appl. No.: 19/027,468

(22) Filed: Jan. 17, 2025

(65) Prior Publication Data

US 2025/0164926 A1 May 22, 2025

Related U.S. Application Data

(63) Continuation-in-part of application No. PCT/CN2023/113753, filed on Aug. 18, 2023.

(30) Foreign Application Priority Data

Aug. 20, 2022 (CN) ......................... 202222201608.3
Feb. 27, 2023 (CN) ......................... 202320350688.0
Feb. 27, 2023 (CN) ......................... 202320350706.5

(51) Int. Cl.
*G03G 21/18* (2006.01)
*G03G 15/00* (2006.01)
*G03G 21/16* (2006.01)

(52) U.S. Cl.
CPC ....... *G03G 21/186* (2013.01); *G03G 15/5008* (2013.01); *G03G 15/75* (2013.01); *G03G 15/757* (2013.01); *G03G 21/1647* (2013.01); *G03G 21/1671* (2013.01); *G03G 21/1857* (2013.01)

(58) Field of Classification Search
CPC .. G03G 15/5008; G03G 15/75; G03G 15/757; G03G 21/186; G03G 21/1647; G03G 21/1671; G03G 21/1857
See application file for complete search history.

(56) References Cited

U.S. PATENT DOCUMENTS

2002/0057928 A1* 5/2002 Yasumoto ............ G03G 15/757 399/167
2007/0253729 A1* 11/2007 Takagi ................. G03G 15/757 399/117
2011/0017003 A1* 1/2011 Taniguchi ............ G03G 15/757 74/412 R

FOREIGN PATENT DOCUMENTS

| | | | |
|---|---|---|---|
| CN | 113574469 | A | 10/2021 |
| CN | 114637175 | A | 6/2022 |
| CN | 116755310 | A | 9/2023 |
| WO | 2023083339 | A1 | 5/2023 |

* cited by examiner

*Primary Examiner* — Joseph S Wong
(74) *Attorney, Agent, or Firm* — ScienBiziP, P.C.

(57) ABSTRACT

The present disclosure provides a power receiving unit cooperated with a driving unit generating a driving force of an electronic imaging apparatus to transmit a power required for a rotation of a photosensitive drum of the electronic imaging device, the driving unit including a driving component and a braking force component arranged side by side along a same axis, the power receiving unit including: a mounting portion, through which the power receiving unit is mounted on an end of the photosensitive drum of the electronic imaging apparatus, the power receiving unit may be coaxially engaged with the driving component, and receives the driving force provided by the driving component for driving the photosensitive drum to rotate.

20 Claims, 17 Drawing Sheets

POWER RECEIVING UNIT AND PROCESSING CARTRIDGE

TECHNICAL FIELD

The present disclosure relates to the field of printing technologies, and more particularly, relates to detachably mounted to a processing cartridge and a power receiving unit of an electronic imaging apparatus.

BACKGROUND

In the related technical field, an electrophotographic imaging apparatus, i.e., an electronic imaging apparatus, typically includes a driving unit for outputting rotational driving force. A processing cartridge may be detachably mounted to the electronic imaging apparatus and cooperate with the driving unit to receive the rotational driving force output by the driving unit. Generally, the processing cartridge is included a power receiving unit, a developing roller as a developing unit, a doctor blade as a toner control unit, and a cartridge body used to accommodate the above-mentioned units, some of the processing cartridge may be further included an photosensitive drum as a photosensitive unit, a charge roller or corona wire, as a charge unit, and an agitating unit etc.

The power receiving unit is disposed on one end of the processing cartridge, and according to different types of the structures of processing cartridges, when the processing cartridge is mounted on the electronic imaging apparatus, the power receiving unit and the driving unit of the electronic imaging apparatus are engaged with each other, so that the rotational driving force output by the driving unit is transmitted to the processing cartridge to drive the rotating unit (such as the developing unit, the photosensitive unit, the agitating unit, etc.) inside the processing cartridge to rotate, thereby participating in the developing work of the electronic imaging apparatus.

Chinese Patent No. CN113574469A discloses a driving unit of an electronic imaging apparatus, which is provided with a driving component and a braking component, wherein the driving component is used to transmit the driving force to the power receiving unit of the processing cartridge, and the braking component is used to apply a braking force to the power receiving unit of the processing cartridge, and the braking force is used to apply a load to resist the rotation of the power receiving unit. In addition to transmitting a driving force to the processing cartridge, this electronic imaging apparatus further is added a braking force. When the processing cartridge is provided with a large number of rotating parts (such as toner feeding rollers or agitating stands) and friction parts (such as cleaning scrapers), there will be a situation of insufficient driving force, thereby affecting the normal operation of the processing cartridge.

BRIEF DESCRIPTION OF THE DRAWINGS

FIG. 10, and FIG. 1 are an overall configuration view of the power receiving unit according to embodiment 1 of the present disclosure.

DESCRIPTION

Figure 1:
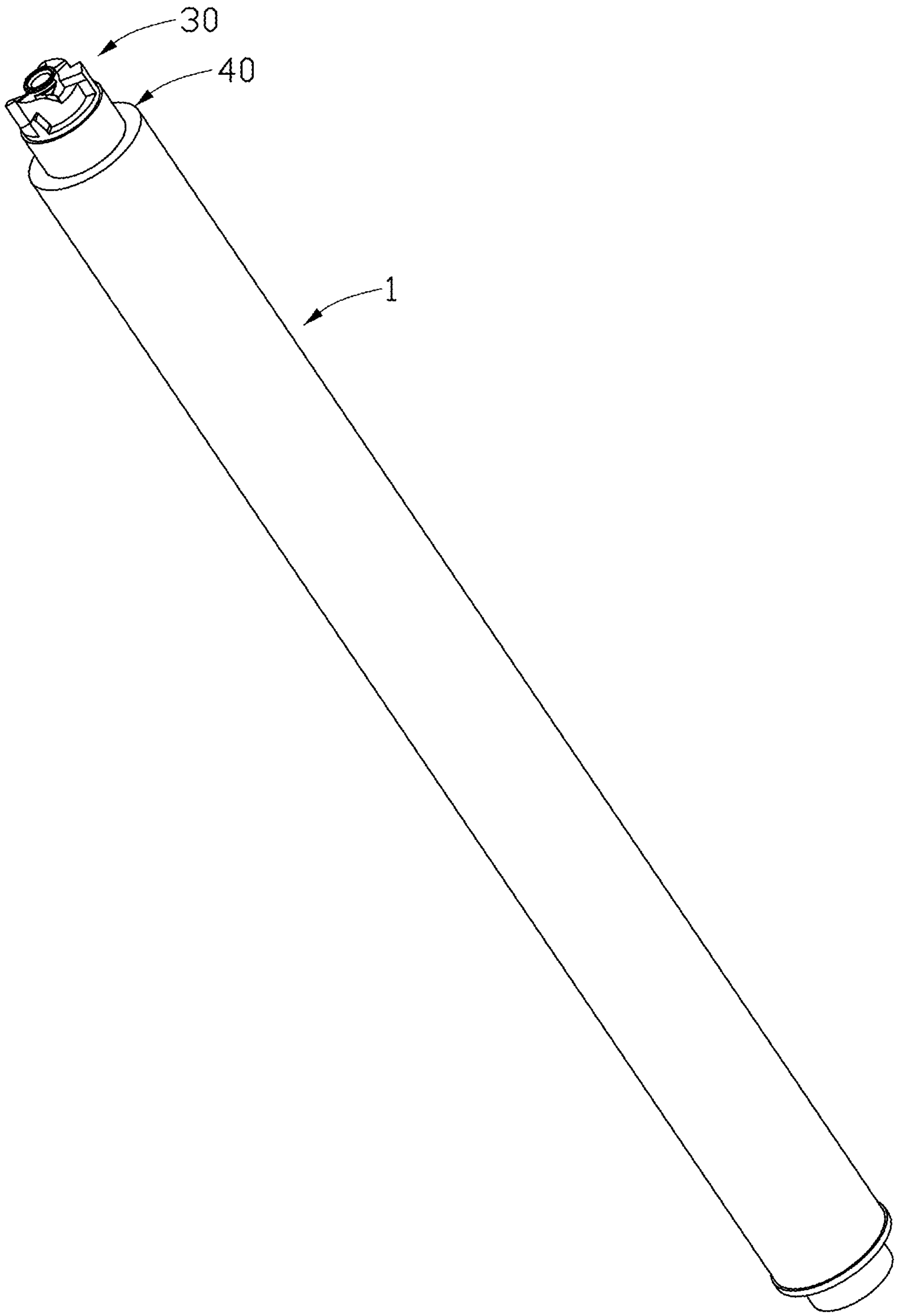
FIG. 1 is a schematic view illustrating an engagement of a power receiving unit and a photosensitive drum according to embodiment 1 of the present disclosure.
Figure 2:
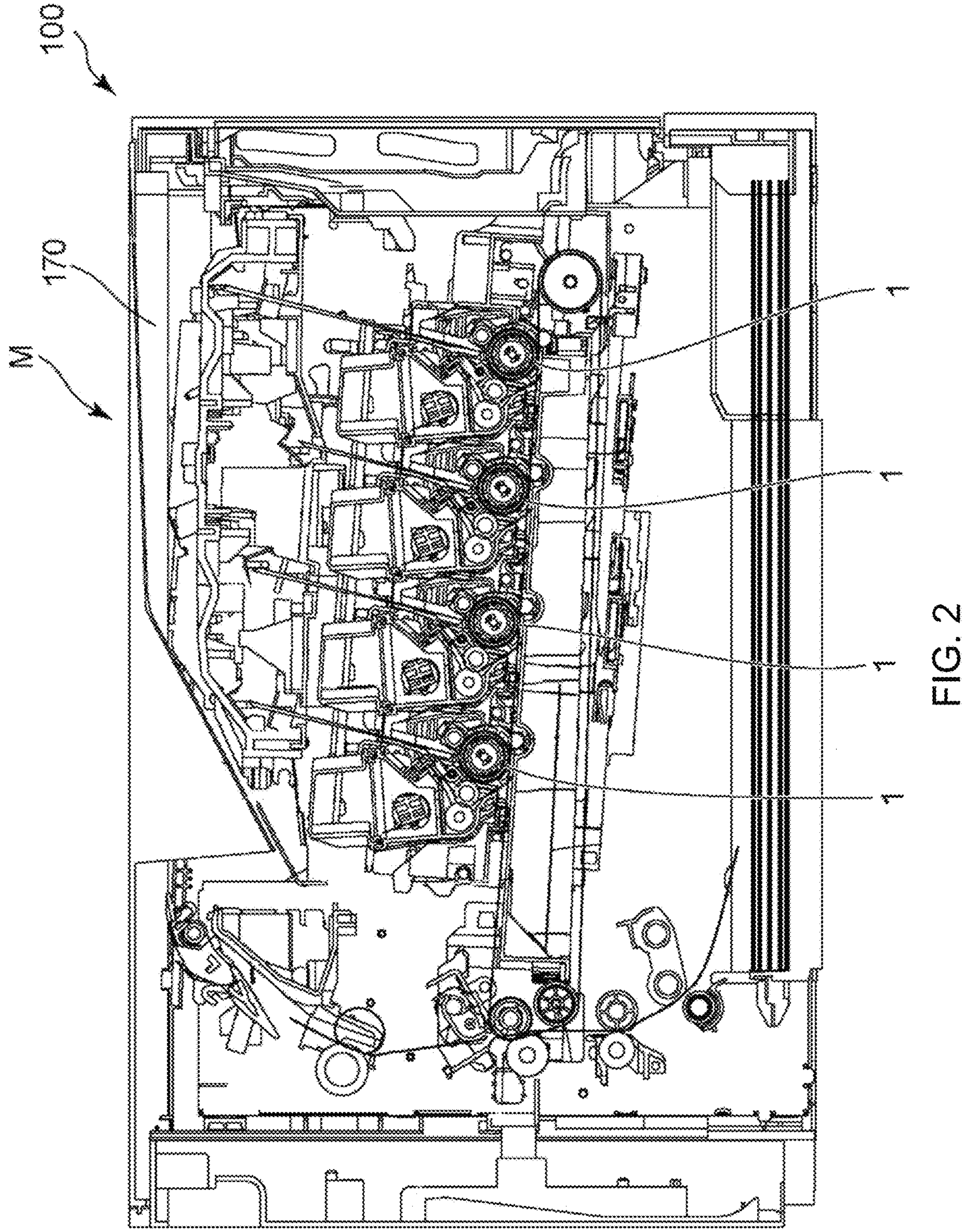
FIG. 2 is a cross-sectional view of an imaging device according to embodiment 1 of the present disclosure.
Figure 3:
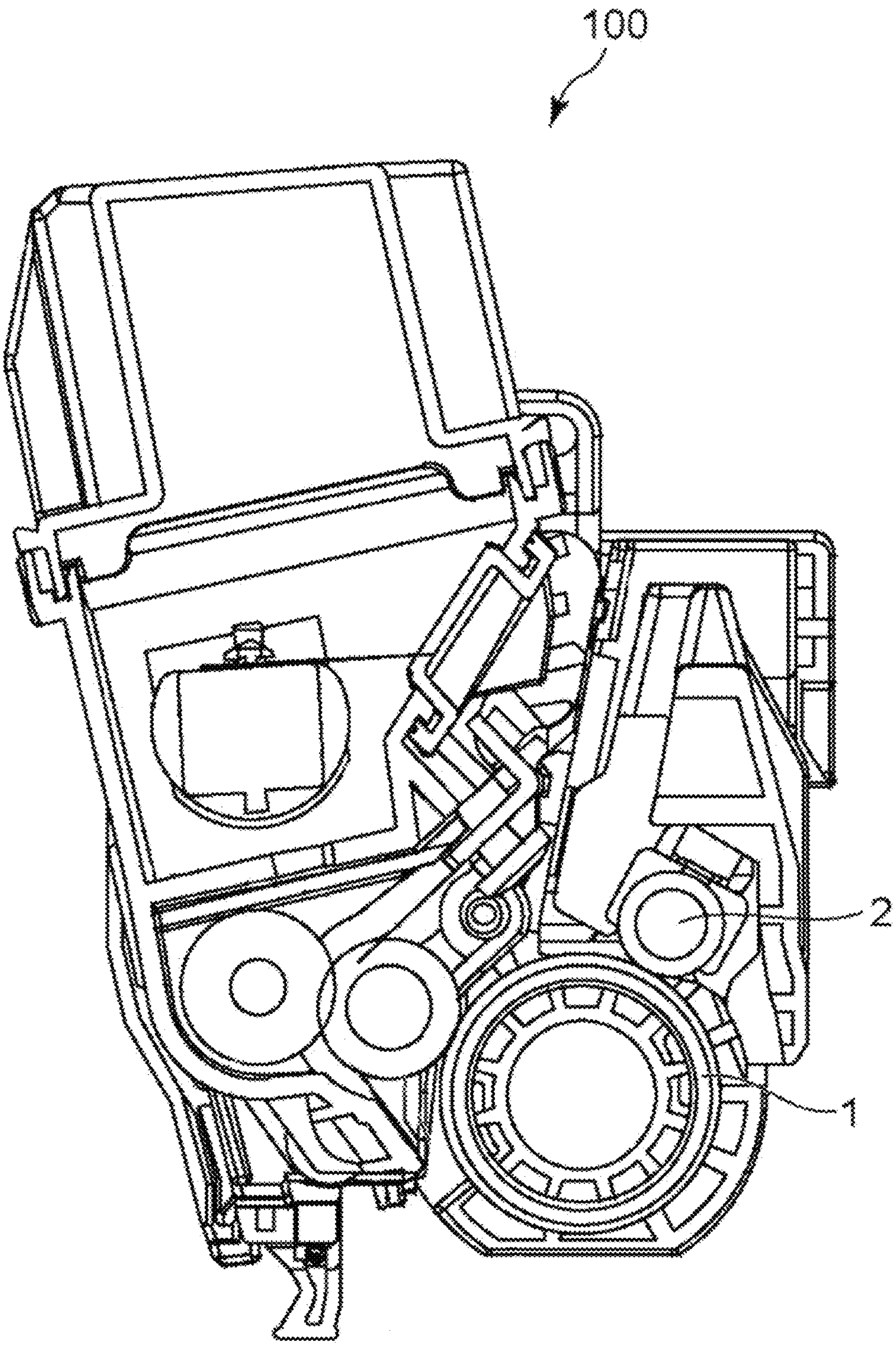
FIG. 3 is a cross-sectional view of a processing cartridge according to embodiment 1 of the present disclosure.
Figure 4:
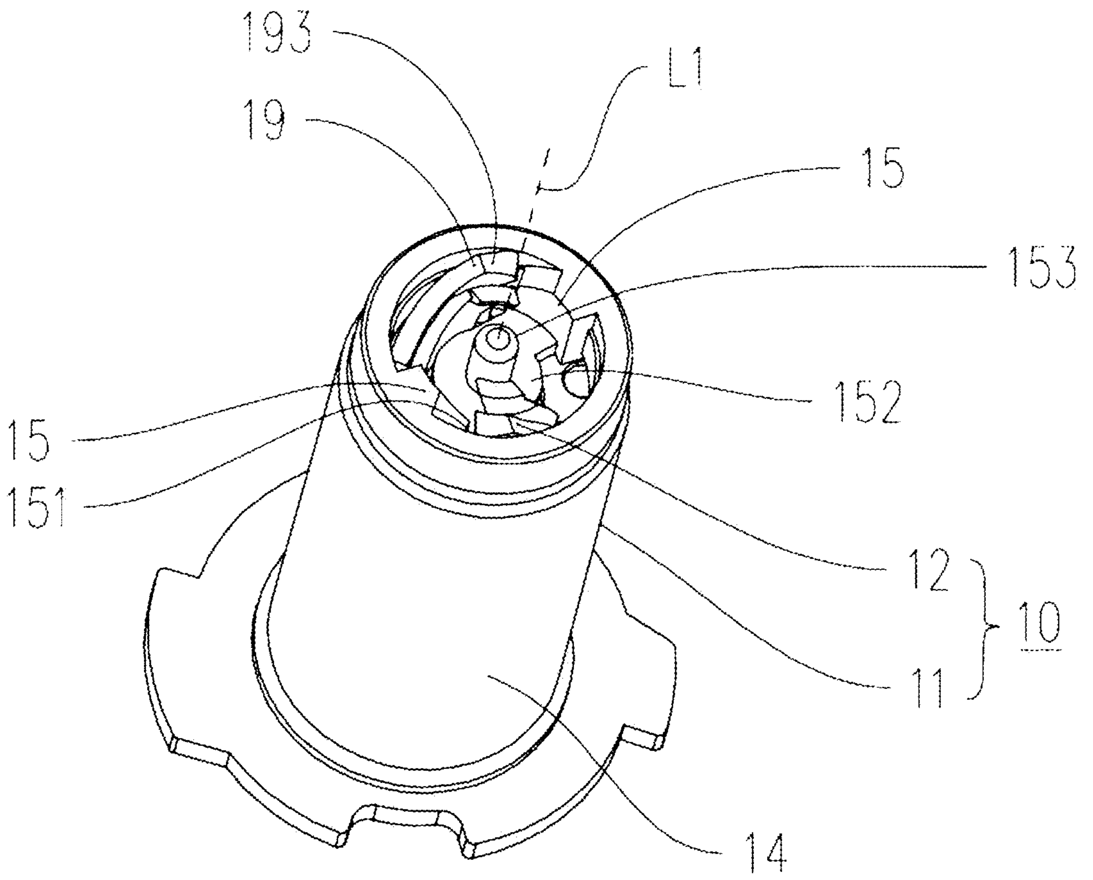
FIG. 4 is an overall configuration view of a driving unit according to embodiment 1 of the present disclosure.

The specific embodiments of the present disclosure is further described below with reference to FIG. 1 to FIG. 26.

Embodiment 1

The embodiment of the present disclosure is provided an electronic imaging apparatus M, as illustrated in FIG. 1 to FIG. 4, the electronic imaging apparatus M refers to a device that forms an image on a recording material by using an electrophotographic imaging method. Examples of an imaging device include a copier, a facsimile machine, a printer (a laser beam printer, a LED printer) etc., in this embodiment, the electronic imaging apparatus M is specifically a four full colors laser printer using an electrophotographic process, and a color image is formed on a recording material S. Simultaneously, the electronic imaging apparatus M is a processing cartridge type, and the processing cartridge is detachably mounted to a imaging device master component (a device master component, an electrophotographic imaging device master component of) 170, to form an color image on a recording material S. The electronic imaging apparatus M includes a master component 170, and is disposed on a driving unit 10 and a power receiving unit 30 in the master component 170. The master component 170 is a general term for the internal structure of the printer, and the master component 170 includes a photosensitive drum 1 and a processing cartridge 100, there are four processing cartridges 100 in total, each of the four processing cartridges 100 is provided with the same electrophotographic processing mechanism, and the colors of the developer are different, the driving force of the driving unit 10 is transmitted to the first to fourth processing cartridges 100 from a drive output portion of the imaging device master component 170. The driving unit 10 is used to output the driving force.

As illustrated in FIG. 1, FIG. 5 to FIG. 7, the driving unit 10 includes a driving component 11 and a braking component 12, the driving component 11 includes a driving member 14. The driving member 14 is an internally hollow cylinder, and the inner surface of the end of the internally hollow cylinder is provided with a driving protrusion 15 protruding inwardly in the radial direction, a positioning portion 152 is provided in the middle, and the driving protrusion transmission surface 151 is provided on one side of the driving protrusion 15 in the circumferential direction, which is used to transmit the driving force to the processing cartridge 100. A positioning column 153 is provided on the positioning portion 152, the positioning column 153 protrudes outwardly along the rotation axis L1 of the driving unit 10. In this embodiment, two driving protrusions 15 are provided, and rotationally symmetrical arrangement with respect to the rotation axis L1.

As illustrated in FIG. 5 to FIG. 9, the braking component 12 includes a braking member 16, a braking transmission member 17, and a braking force engagement member (unmarked). The braking force engagement member includes a first braking force engagement member 18 and a second braking force engagement member 19, the braking member 16 is capable of generating a braking force, and such a braking force can be applied to the power receiving unit to generate a load that resists the rotation of the power receiving unit.

The braking member 16 includes a fixing portion 161, a braking portion 162 and a connecting portion 163, wherein the fixing portion 161 with a hollow cylindrical shape is fixedly supported on a supporting shaft of the electronic imaging apparatus M, and the supporting shaft has a speed difference with the driving component 11, and the preferred rotation speed of the supporting shaft is lower than the rotation speed of the driving component 11. The braking portion 162 is roughly cylindrical and has a hollow space inside. The braking portion 162 is rotatably arranged on the fixing portion 161 and can rotate relative to the fixing portion 161, and resistance, i.e., the braking force, can be generated between the braking portion 162 and the fixing portion 161, and the power of the braking force is along the rotation direction of the braking portion 162. The generation of the braking force can be a friction resistance, an elastic resistance, or a sticking force, etc., generated between the braking portion 162 and the fixing portion 161.

The connecting portion 163 is connected to the braking portion 162, and can rotate along with the rotation of the braking portion 162. The connecting portion 163 is provided with a braking groove 164.

The braking transmission member 17 includes a shaft portion 171 and a flange portion 174. The end of the shaft portion 171 closed to the brake member 16 is provided with a flat structure 172, which is inserted into the braking groove 164 of the connecting portion 163 so as to drive the braking portion 162 to rotate when the braking transmission member 17 rotates. In the direction of the rotation axis L1, the braking transmission member 17 may be slid relative to the braking member 16. The flange portion 174 is located at the other end of the shaft portion 171 away from the braking member 16. The flange portion 174 is provided with a braking force transmission portion 173 on one side closed to the braking member 16. The braking force transmission portion 173 protrudes inwardly along the rotation axis L1 of the driving unit 10, i.e., the braking force transmission portion 173 extends toward the center of the braking member 16 along the rotation axis L1 of the driving unit 10. A protrusion portion 175 is further protruded circumferentially on the side of the flange portion 174 away from the braking force transmission portion 173, and the protrusion portion 175 is used to limit the distance that the driving component 10 is extended and retracted toward the power receiving unit 30.

The first braking force engagement member 18 is provided with a first flange portion 181, a first protrusion portion 182 located at the end surface of the first flange portion 181, a group of first engaging portions 183 extending outwardly from the first flange portion 181 along the rotation axis L1, and a first through hole 184. The second braking force engagement member 19 is provided with a second flange portion 191, a notched portion 192 located at the outside of the second flange portion 191, a group of second engaging portions 193 extending outwardly from the second flange portion 191 along the rotation axis L1, and a second through hole 194. The first protrusion portion 182 and the notched portion 192 are combined so that the first braking force engagement member 18 and the second braking force engagement member 19 are formed as one body, to the first braking force engagement member 18 and the second braking force engagement member 19 move together in the direction of the rotation axis L1.

The first braking force engagement member 18 is located at the inside of the second braking force engagement member 19. The first braking force engagement member 18 and the second braking force engagement member 19 are movable together on the rotation axis L1 of the driving unit 10. The bottom portion 194 of the second flange portion 191 is further provided with a braking force receiving protrusion 195 extending outwardly along the rotation axis L1.

The shaft portion 171 of the braking transmission member 17 passes through the first through hole 184 and the second through hole 194, and the braking force transmission portion 173 may be combined with the braking force receiving protrusion 195 along the direction of the rotation axis L1, so that when the first braking force engagement member 18 and the second braking force engagement member 19 is rotated, the braking transmission member 17 may be drove to rotate, and then the braking portion 162 of the braking member 16 is drove to rotate, so that the braking force may be transmitted to the first braking force engagement member 18 and the second braking force engagement member 19 through the brake transmission member 17.

Figure 7:
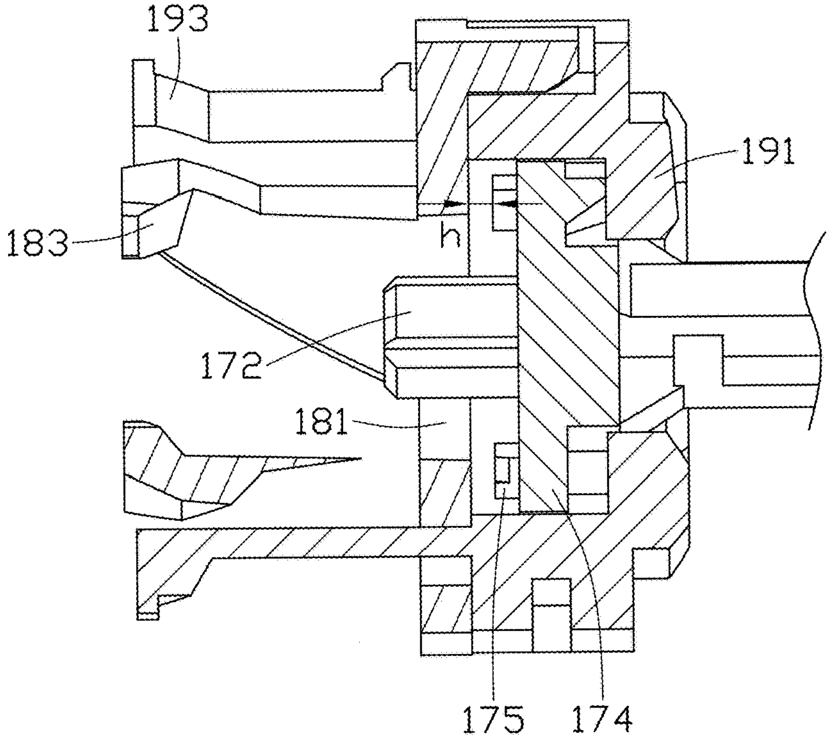
FIG. 7 is a cross-sectional schematic view, viewed from another angle of the driving component according to embodiment 1 of the present disclosure.
Figure 8:
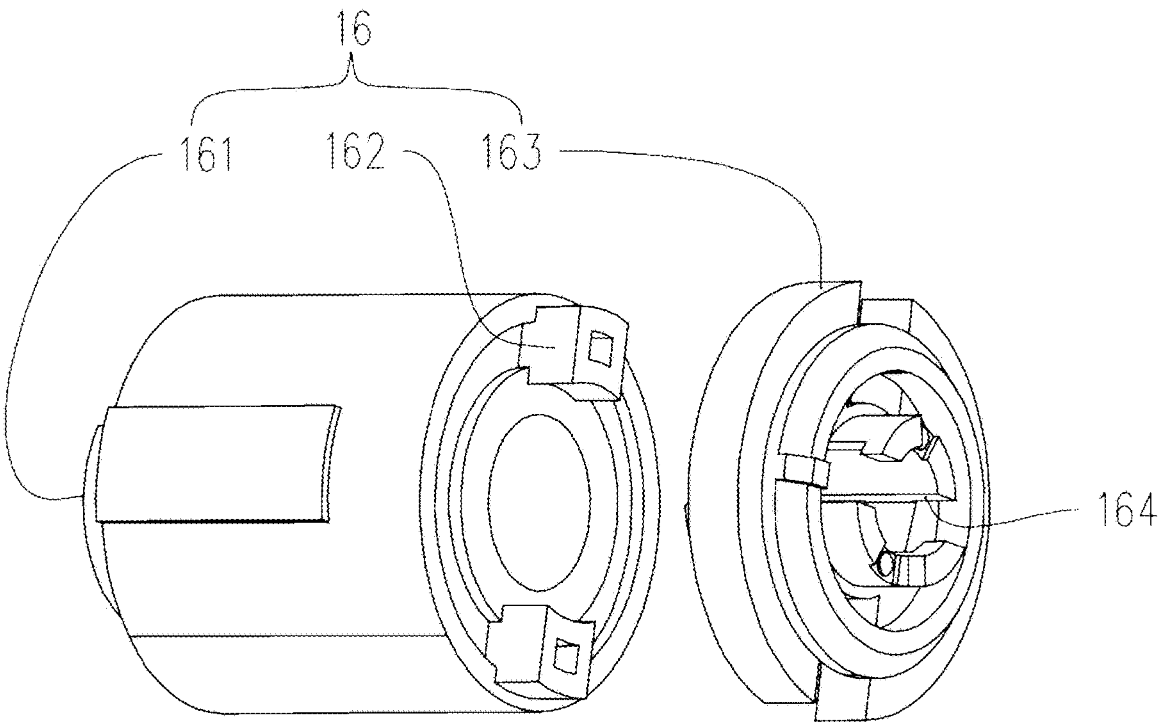
FIG. 8 is an exploded perspective view of a braking member according to embodiment 1 of the present disclosure.
Figure 9:
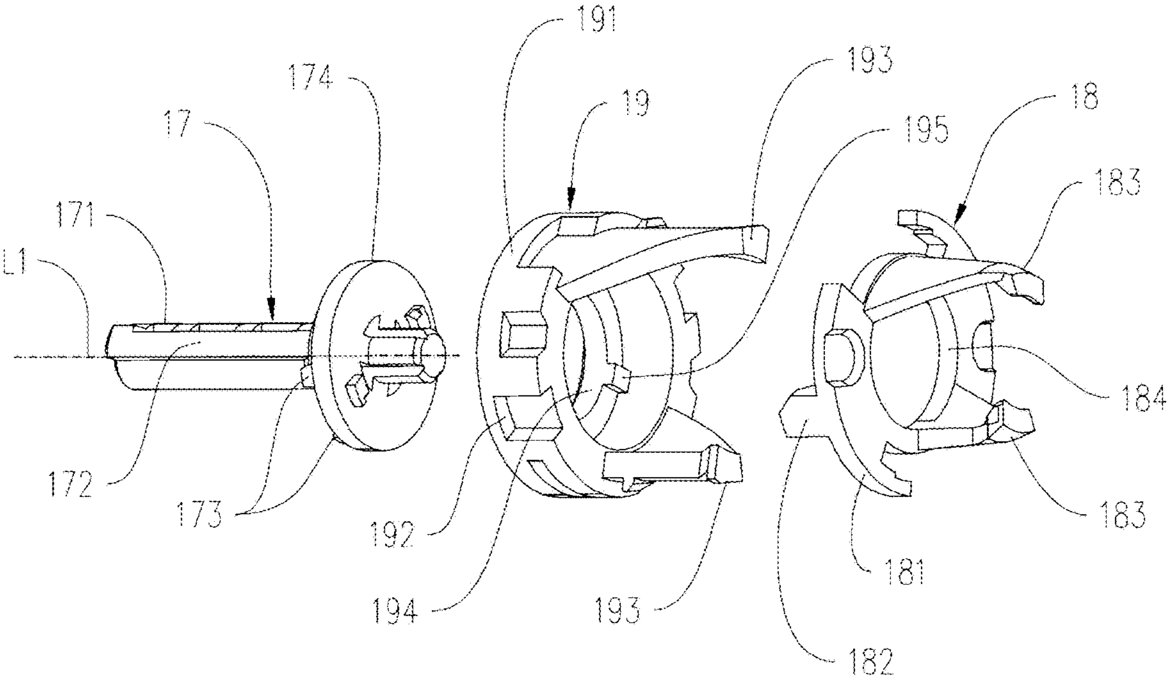
FIG. 9 is an exploded perspective view of a braking transmission member, a first power engaging member and a second power engaging member, according to embodiment 1 of the present disclosure.

Referring to FIG. 7, when the braking transmission member 17 is combined with the first braking force engagement member 18 and the second braking force engagement member 19. A distance h is formed between the protrusion portion 175 and the first flange portion 181. h is defined as the distance difference when the driving unit 10 extends toward the power receiving unit 30 and abuts each other. In the embodiment, the value of h is 0.6 mm, that is, when h is 0.6, and the driving unit 10 extends toward the power receiving unit 30, it can inevitably abut the power receiving unit 30.

Figure 5:
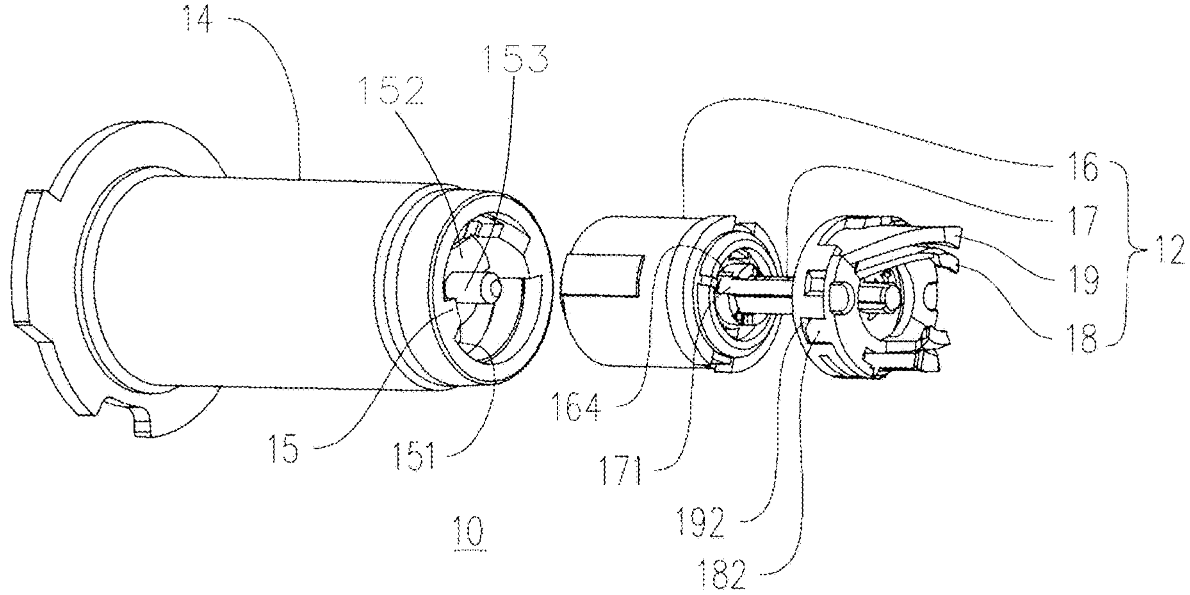
FIG. 5 is an exploded perspective view of a driving component and a braking component according to embodiment 1 of the present disclosure.
Figure 6:
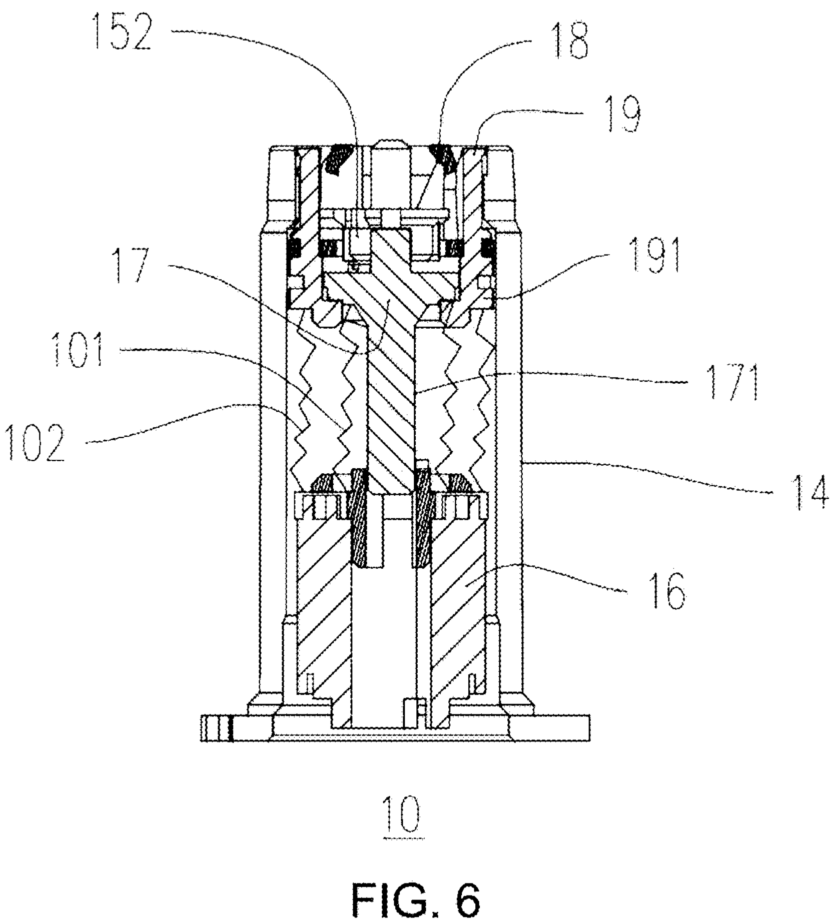
FIG. 6 is a cross-sectional schematic view of the driving unit according to embodiment 1 of the present disclosure.

As illustrated in FIG. 1, FIG. 5 to FIG. 6, the braking component 12 is basically accommodated in the hollow space of the driving member 14, and when the braking component 12 is not loaded in the processing cartridge 100, the second engaging portion 193 of the second braking force engagement member 19 and the driving protrusion transmission surface 151 on the driving protrusion 15 may face and come into contact with each other. When the driving member 14 is rotated, the driving member 14 may transmit the driving force to the second engaging portion 193, so that the second braking force engagement member 19 is rotated.

As illustrated in FIG. 6, the driving unit 10 is further provided with a first elastic member 101 and a second elastic member 102.

One end of the first elastic member 101 is abutted the upper end of the braking force transmission member 17, and the other end is abutted the end surface of the braking member 16, so that the braking force transmission member 17 is supported at a preset initial position relative to the braking member 16, and one end of the shaft portion 171 of the braking transmission member 17 may be abutted the positioning portion 152 of the driving member 14. When the driving member 14 is subjected to the force along the direction of the rotation axis L1, the driving member 14 may be moved inward along the rotation axis L1, and further drove the braking force transmission member 17 to move inward, and the first elastic member 101 is compressed. When the external force applied to the driving member 14 disappears, the first elastic member 101 is restored, and the driving member 14 and the braking force transmission member 17 move outward along the rotation axis L1 to restore to the initial state. The driving member 14 may be moved inward along the rotation axis L1 to retract toward the inside of the housing of the electronic imaging apparatus M, away from the processing cartridge 100.

One end of the second elastic member 102 is abutted the end surface of the second flange portion 191 of the second braking force engagement member 19, and the other end is abutted the end surface of the braking member 16, so that the first braking force engagement member 18 and the second braking force engagement member 19 are supported at a preset initial position, at the preset initial position, the braking force transmission portion 173 and the braking force receiving protrusion 195 may be abutted and transmitted torque in the circumferential direction, and the first braking force engagement member 18 and the second braking force engagement member 19 may be applied with a braking force. When the first braking force engagement member 18 and the second braking force engagement member 19 are subjected to an inward force acting in the direction of the rotation axis L1, the first braking force engagement member 18 and the second braking force engagement member 19 may be moved inward along the rotation axis L1; when the external force disappears, the first braking force engagement member 18 and the second braking force engagement member 19 may be restored to the preset initial position under the elastic restoring force of the second elastic member 102.

Figure 10:
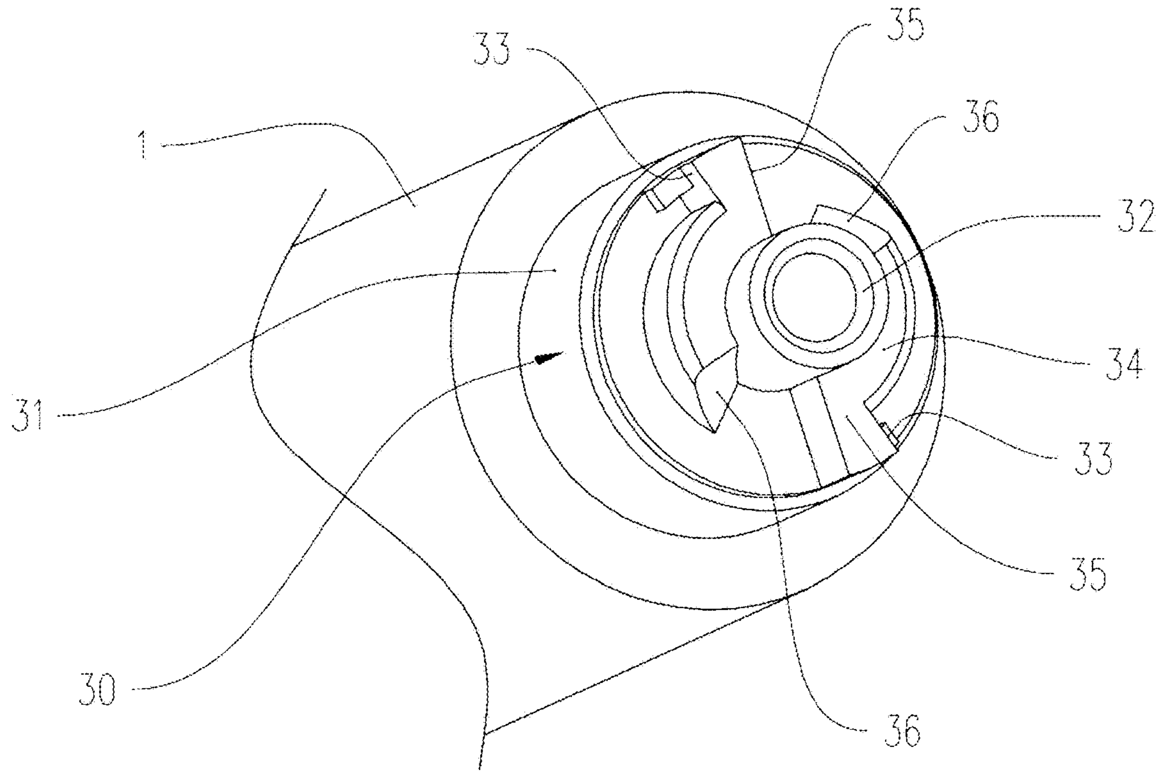
Figure 11:
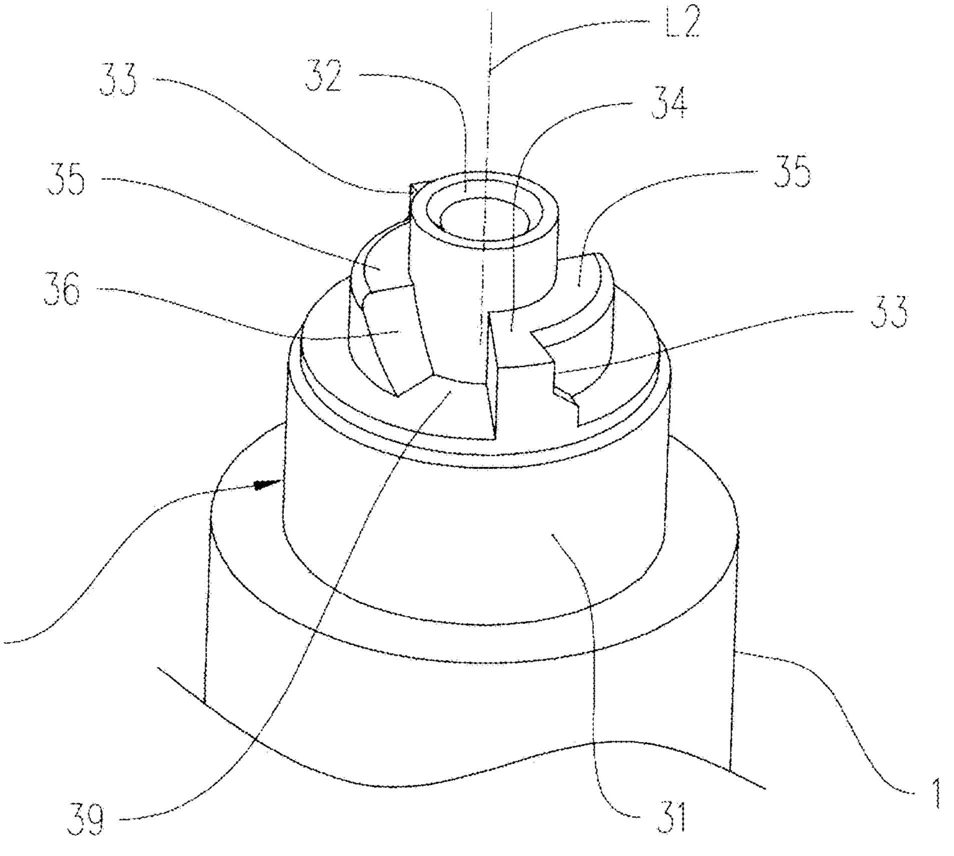

A processing cartridge 100 is illustrated in FIG. 10 and FIG. 11, the processing cartridge 100 includes a toner hopper unit and a photosensitive unit. The toner hopper unit includes a developing roller, a doctor blade, a toner feeding roller, an agitating stand, etc., and the photosensitive unit includes a photosensitive drum 1 and a charge roller 2, etc. The processing cartridge 100 further includes a power receiving unit 30 and a mounting portion 40 for receiving an external driving force, and the power receiving unit 30 is mounted on an end of the photosensitive drum 1 of the electronic imaging apparatus M by the mounting portion 40.

The developing roller rotates under the driving action to drive the developer to be transferred to the photosensitive drum 1. The doctor blade can adjust the uniformity of the developer on the developing roller. The agitating stand can loosen the developer in the toner hopper unit. The charge roller 2 is used to charge the photosensitive drum 1.

As illustrated in FIG. 10 and FIG. 11, the processing cartridge 100 includes a cartridge body (not shown in the drawings), the photosensitive drum 1 is rotatably supported on the cartridge body, and the power receiving unit 30 is disposed at one end of the photosensitive drum 1.

The power receiving unit 30 includes a main body portion 31 with cylindrical and a positioned portion 32, a driving force receiving portion 33 and a pressing portion 34 arranged on the main body portion 31. The positioned portion 32 is located in a hole portion of the main body portion 31 and is located at the middle end of the main body portion 31, for receiving the positioning column 153 of the driving member 14.

The driving force receiving portion 33 and the pressing portion 34 are arranged outside the circumference of the positioned portion 32, wherein the driving force receiving portion 33 is used to engage with the driving protrusion 15 to receive the driving force. The pressing portion 34 extends radially from the circumference of the positioned portion 32 to the outside of the circumference of the main body portion 31, for pressing the first braking force engagement member 18 and/or the second braking force engagement member 19, so that the first braking force engagement member 18 and the second braking force engagement member 19 are moved in the direction of the rotation axis L1 of the driving unit 10 in a direction away from the photosensitive drum 1 (that is, in a direction close to the braking member 16), and the braking force transmission portion 173 disengages from the braking force receiving protrusion 195 along the direction of the rotation axis L1, and the braking force on the first braking force engagement member 18 and the second braking force engagement member 19 may be unloaded, that is, no braking force is applied during the rotation of the first braking force engagement member 18 and the second braking force engagement member 19.

Preferably, a protrusion structure 35 is provided on the circumferential outer side of the end of the main body portion 31 with cylindrical, and the driving force receiving portion 33 is provided on one side of the protrusion structure 35 along the circumferential direction. The driving force receiving portion 33 is arranged to a straight-surface structure, that is, a normal plane perpendicular to the rotation axis L2 of the power receiving unit 30. The pressing portion 34 is provided on the end surface of the protrusion structure 35 along the rotation axis L2. Preferably, two protrusion structures 35 are provided, and the two protrusion structures 35 are rotationally symmetrical arrangement with respect to the rotation axis L2.

In the embodiment, a guided surface 36 is further provided on the other side of the protrusion structure 35 along the circumferential direction, and the guided surface 36 is located on the other side opposite to the driving force receiving portion 33, and closer to the positioned portion 32 than the driving force receiving portion 33. When the first engaging portion 183 and/or the second engaging portion 193 falls into the notched portion 39 between the two protrusion structures 35, that is, when the first engaging portion 183 and/or the second engaging portion 193 are not initially affected by the pressing portion 34, under the push of the driving member 14, the first engaging portion 183 and/or the second engaging portion 193 are forced to rotate, and the first engaging portion 183 and/or the second engaging portion 193 may be guided to the position of the pressing portion 34 by the guided surface 36, so as to be pressed by the pressing portion 34, and the first engaging portion 183 and/or the second engaging portion 193 may be rotated without receiving the braking force.

Next, the fitting process between the driving unit and the power receiving unit during the installation of the processing cartridge 100 will be described in conjunction with FIG. 1 to FIG. 14.

Figure 12:
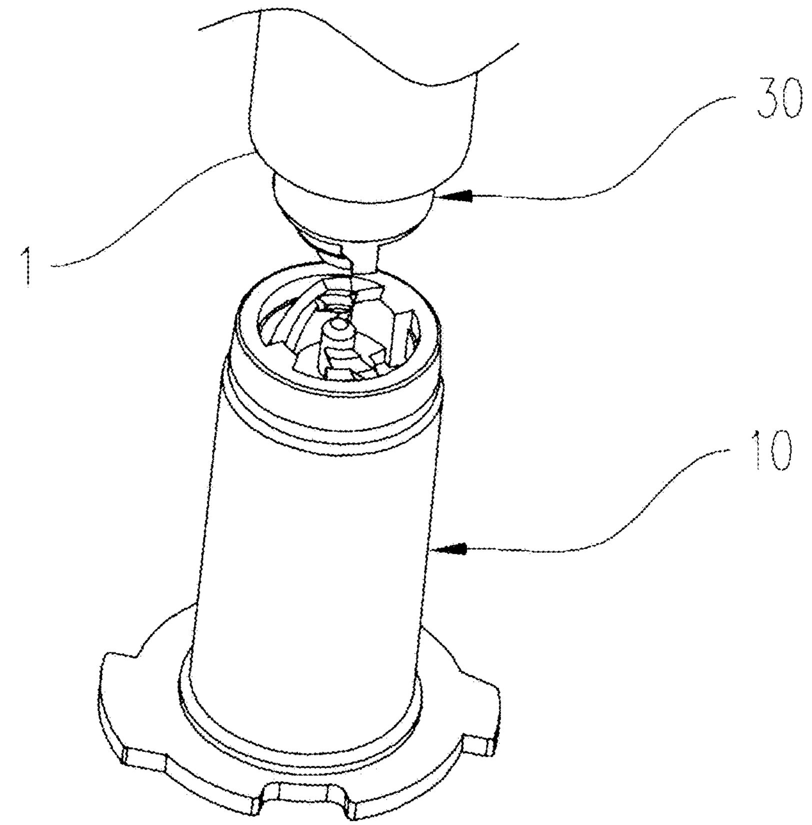
FIG. 12 to FIG. 14 is a relationship view between the driving unit and the power receiving unit during a process that the processing cartridge is mounted to an electronic imaging apparatus according to embodiment 1 of the present disclosure.
Figure 13:
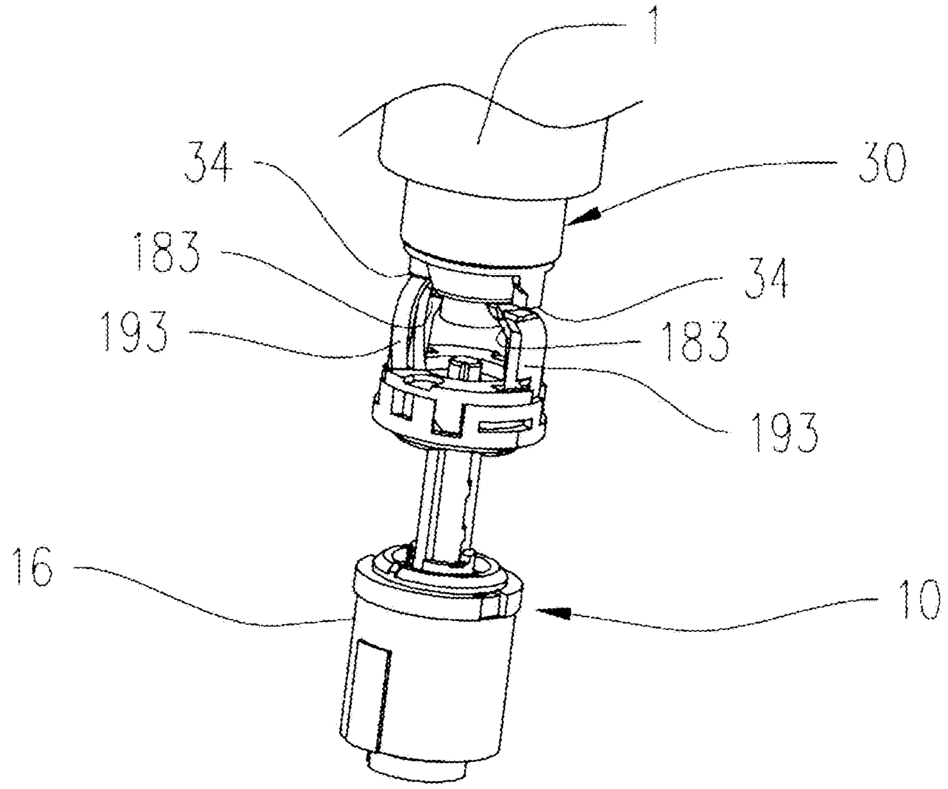

During the process of mounting the processing cartridge 100 to the electronic imaging apparatus M, as illustrated in FIG. 12, the driving unit 10 and the power receiving unit 30 approach each other. As the processing cartridge 100 is mounted, in FIG. 13, the pressing portion 34 of the power receiving unit 30 first contacts the first engaging portion 183 and the second engaging portion 193.

Figure 14:
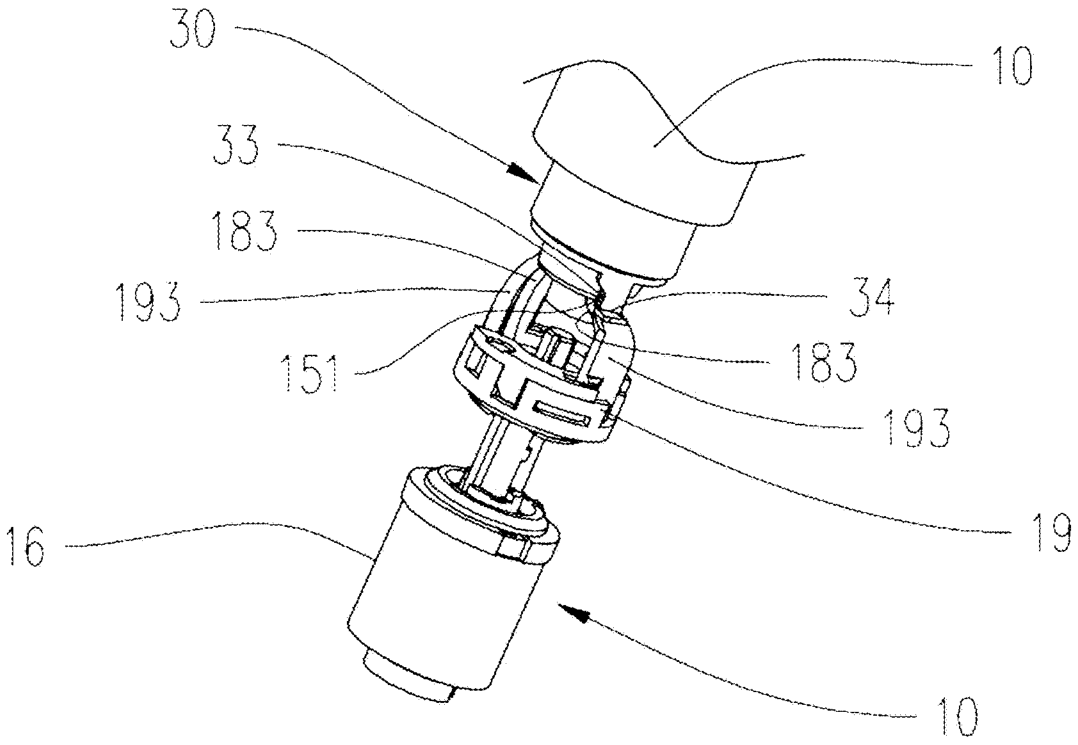

As the processing cartridge 100 is mounted in place, as illustrated in FIG. 14, the first engaging portion 183 and the second engaging portion 193 are pressed by the pressing portion 34 and move in the direction of the rotation axis L1 of the driving unit 10 away from the photosensitive drum 1 (that is, in the direction closed to the braking member 16). Combined with FIG. 6 and FIG. 9, the second elastic member 102 is compressed, and the braking force receiving protrusion 195 is disengaged from the braking force transmission portion 173 along the direction of the rotation axis L1.

At this time, when the electronic imaging apparatus M is started to work, as the driving member 14 rotates, the driving force transmission surface 151 of the driving protrusion 15 is engaged with the driving force receiving portion 33 of the power receiving unit 30 and drove the power receiving unit 30 to rotate, while further driving the first braking force engagement member 18 and the second braking force engaging member 19 to rotate. At this time, the first braking force engagement member 18 and the second braking force engagement member 19 are no longer subjected to braking force by the braking member 16.

In the processing cartridge 100 with the above structure, the power receiving unit 30 is not added with the braking force from the braking member 16 when receiving the driving force to rotate, that is, no additional load is added, and the power is sufficient. More rotating parts (toner feeding rollers or agitating stands, etc.) or friction parts (such as sealing felts, etc.) may be arranged on the processing cartridge 100 without insufficient power.

Embodiment 2

The present embodiment is an improvement on the embodiment 1, and the relevant description part refers to the drawings and explanations in the embodiment 1. The shape and structure of the processing cartridge 100 (not shown in the figure) of the present embodiment are basically the same as those of the processing cartridge 100 of the embodiment 1, and the main difference is that the structure of the power receiving unit B30 is different.

Figure 15:
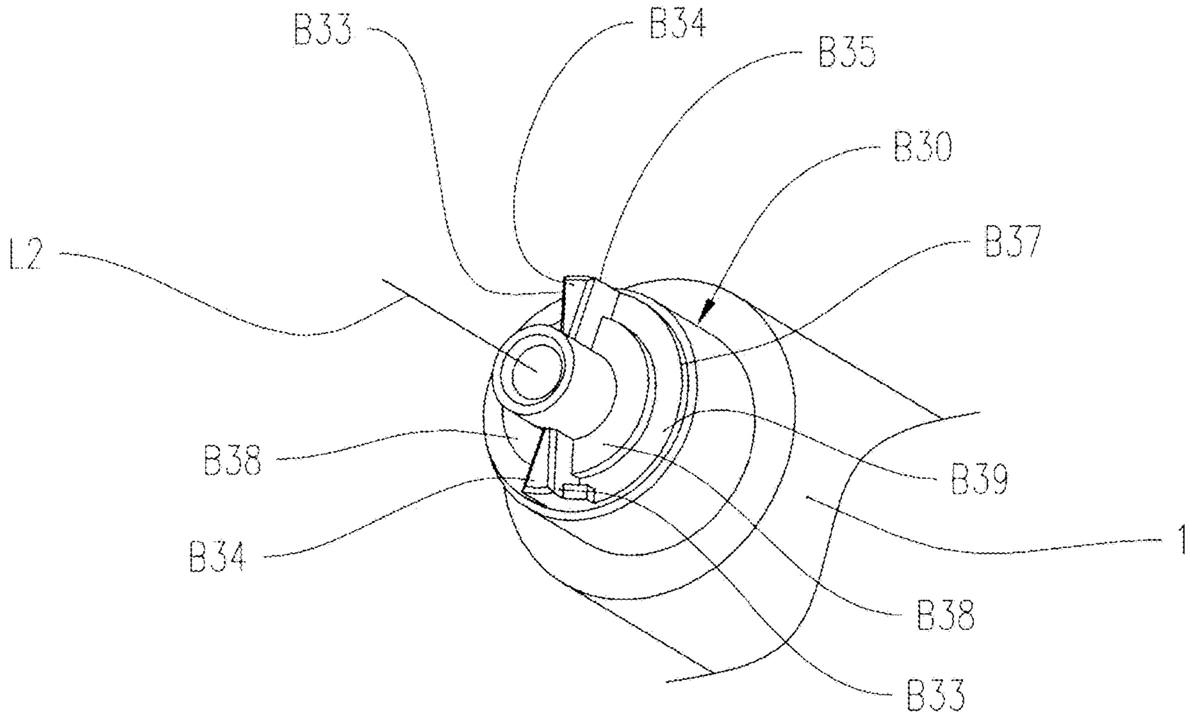
FIG. 15 is a schematic view of the power receiving unit according to embodiment 2 of the present disclosure.

As illustrated in FIG. 15, the power receiving unit B30 is provided with two protrusion structures B35 which are rotationally symmetrical arrangement with respect to the rotation axis L2 of the power receiving unit B30, and the protrusion structure B35 is provided with a driving force receiving portion B33 and a pressing portion B34. Compared with Example 1, the guided surface 36 is cancelled, and it can also press the first braking force engagement member 18 and/or the second braking force engagement member 19, so that the first engaging portion 183 and the second engaging portion 193 are pressed by the pressing part B34 and move in the direction of the rotation axis L1 of the driving unit 10 away from the photosensitive drum 1 (that is, in the direction closed to the braking member 16), and the braking force transmission part 173 is disengaged from the braking force receiving protrusion 195 along the direction of the rotation axis L1, and the braking force on the second braking force engagement member 19 is unloaded.

A developing cartridge with the above structure includes a power receiving unit B30 with a simpler structure and a simplified structure.

Preferably, in the present embodiment, a stepped portion B37 is provided between the two protrusion structures B35 of the power receiving unit B30, and the stepped portion B37 includes a first stepped surface B38 and a second stepped surface B39, wherein in the direction of the rotation axis L2 of the power receiving unit B30, the first stepped surface B38 is farther away from the photosensitive drum 1 than the second stepped surface B39. In the radial direction of the power receiving unit B30, the first stepped surface B38 is closer to the rotation axis L2 of the power receiving unit B30 than the second stepped surface B39.

When the processing cartridge 100 is mounted in the electronic imaging apparatus M, the first stepped surface B38 may be pressed the first engaging portion 183, so that the first braking force engagement member 18 and the second braking force engagement member 19 may be stably pressed and in a state of unloading the braking force. As an improvement, the second stepped surface B39 may be pressed the second engaging portion 193.

Embodiment 3

The present embodiment is an improvement on the embodiment 1, and the relevant description part refers to the drawings and explanations in the embodiment 1. The shape and structure of the processing cartridge 100 (not shown in the figure) of the present embodiment are basically the same as those of the processing cartridge 100 of the embodiment 1, and the main difference is that the structure of the power receiving unit C30 is different.

Figure 16:
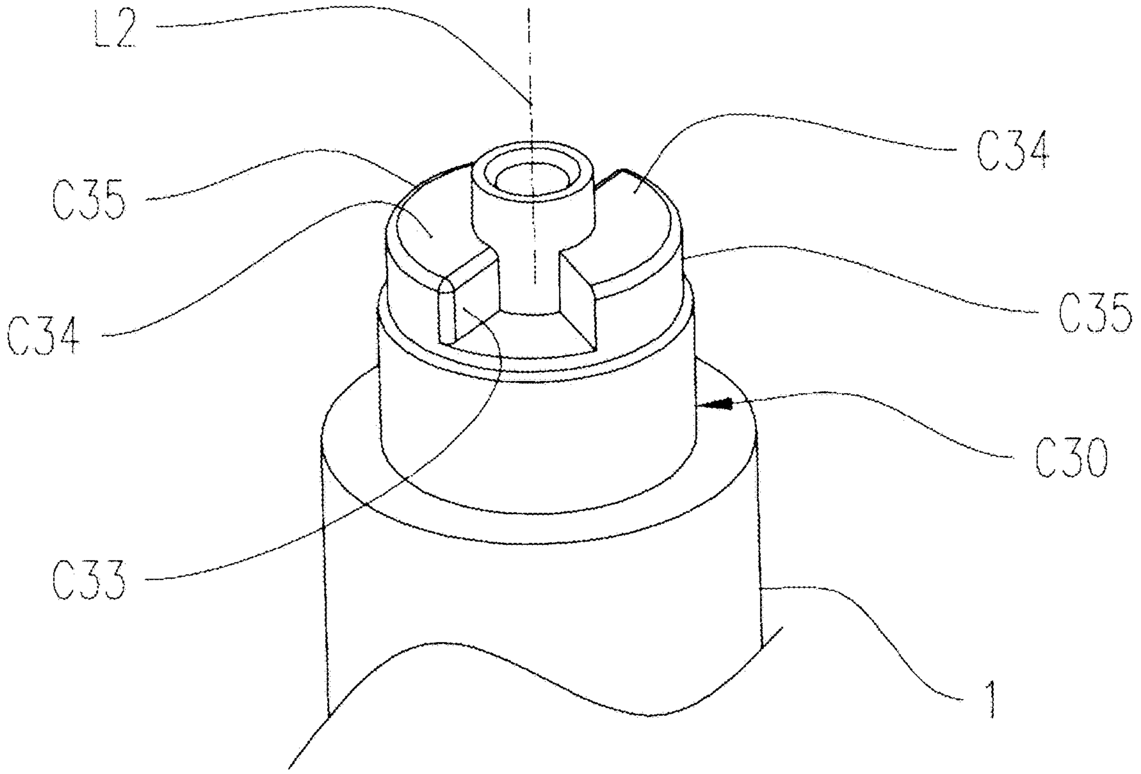
FIG. 16 is a schematic view of the power receiving unit according to embodiment 3 of the present disclosure.

As illustrated in FIG. 16, the power receiving unit C30 is provided with two protrusion structures C35 which are rotationally symmetrical arrangement with respect to the rotation axis L2 of the power receiving unit C30, and the protrusion structure C35 is provided with a driving force receiving portion C33 and a pressing portion C34.

In this embodiment, the pressing portion C34 is configured to a larger arc center angle, and the distance between the front and rear ends of the pressing portion C34 in the rotation direction of the power receiving unit C30 is greater than the distance between the two protrusion structures C35. The arc center angle corresponding to the pressing portion C34 is greater than 90 degrees and less than 180 degrees.

The power receiving unit C30 with a structure is configured to ensure that the pressing portion C34 may be pressed to the first braking force engagement member 18 and/or the second braking force engagement member 19 when the processing cartridge 100 is mounted to the electronic imaging apparatus M, thereby making it so that the first braking force engagement member 18 and the second braking force engagement member 19 are no longer subjected to braking force during rotation.

Embodiment 4

The present embodiment is an improvement on the embodiment 3, and the relevant description part refers to the drawings and explanations in the embodiment 3. The shape and structure of the processing cartridge 100 (not shown in the figure) of the present embodiment are basically the same as those of the processing cartridge 100 of the embodiment 3, and the main difference is that the structure of the power receiving unit D30 is different.

Figure 17:
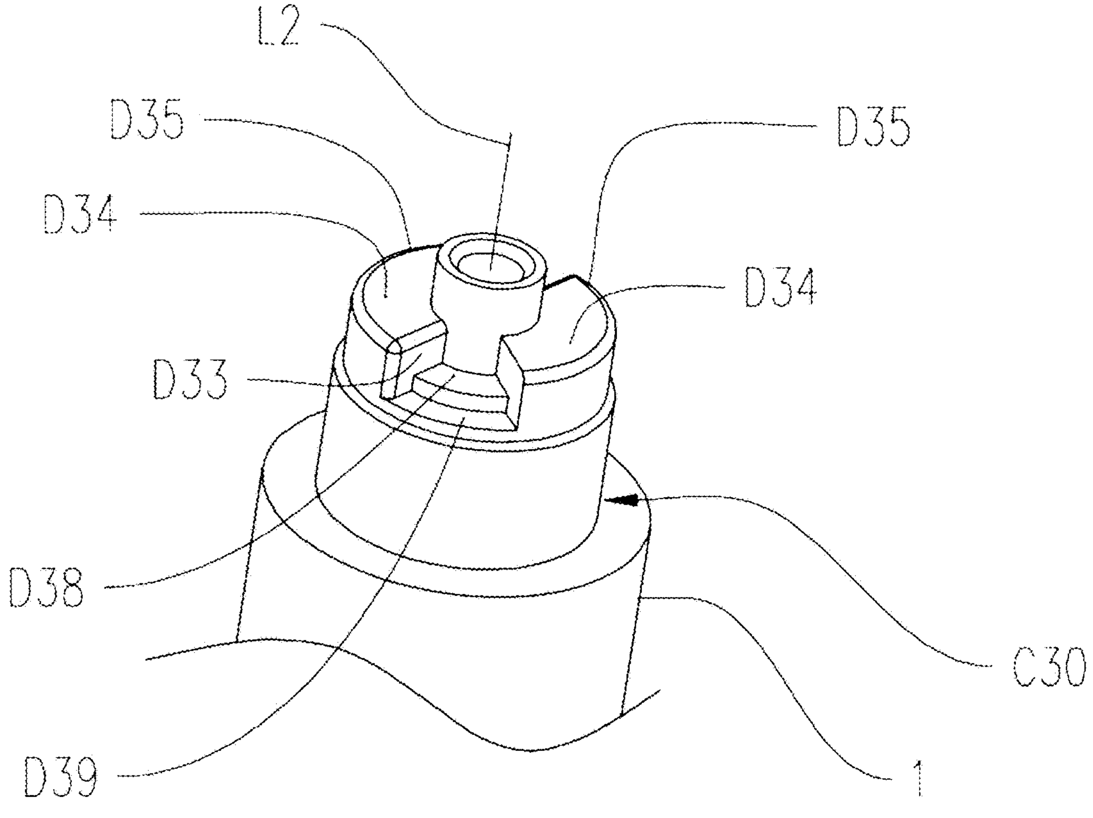
FIG. 17 is a schematic view of the power receiving unit according to embodiment 4 of the present disclosure.

As illustrated in FIG. 17, the power receiving unit D30 is provided with two protrusion structures D35 which are rotationally symmetrical arrangement with respect to the rotation axis L2 of the power receiving unit D30, and the protrusion structure D35 is provided with a driving force receiving portion D33 and a pressing portion D34.

In this embodiment, a stepped portion D37 is provided between the two protrusion structures D35 of the main body portion 31 of the power receiving unit D30, and the stepped portion D37 includes a first stepped surface D38 and a second stepped surface D39, wherein in the direction of the rotation axis L2 of the power receiving unit D30, the first stepped surface D38 is farther away from the photosensitive drum 1 than the second stepped surface D39. In the radial direction of the power receiving unit D30, the first stepped surface D38 is closer to the rotation axis L2 of the power receiving unit D30 than the second stepped surface D39.

When the processing cartridge 100 is mounted in the electronic imaging apparatus M, the first stepped surface D38 may be pressed the first engagement portion 183, so that the first braking force engagement member 18 and the second braking force engagement member 19 may be stably pressed and in a state of unloading the braking force.

As an improvement, the second stepped surface D39 may be pressed the second engaging portion 193.

Embodiment 5

The present embodiment is an improvement on the embodiment 2, and the relevant description part refers to the drawings and explanations in the embodiment 2. The shape and structure of the processing cartridge 100 (not shown in the figure) of the present embodiment are basically the same as those of the processing cartridge 100 of the embodiment 2, and the main difference is that the structure of the power receiving unit E30 is different.

Figure 18:
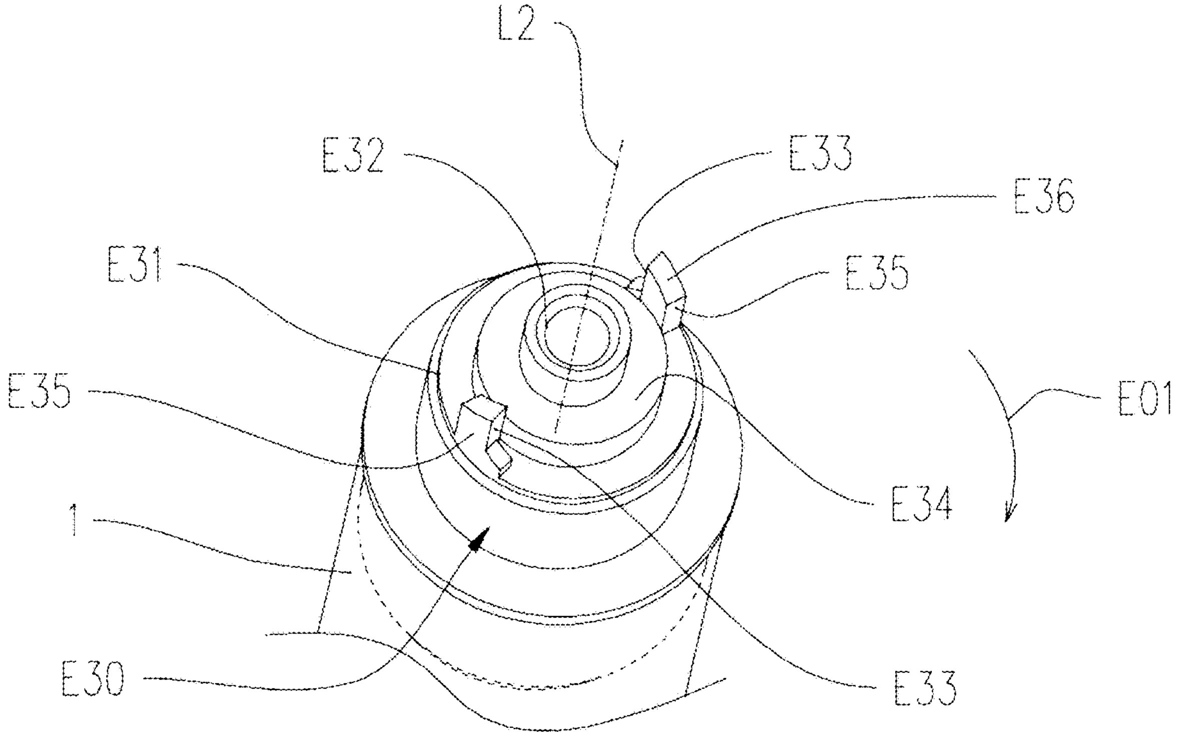
FIG. 18 is a schematic view of the power receiving unit according to embodiment 5 of the present disclosure.

As illustrated in FIG. 18, the power receiving unit E30 is used to be mounted at the end of the photosensitive drum 1, and includes a main body portion E31, and a driving force receiving portion E33 arranged on the main body portion E31. The driving force receiving portion E33 is used to receive the driving force from the driving component 11 of the electronic imaging apparatus M.

The pressing portion E34 is disposed on the main body portion E31, and applies a force to the braking force engaging member of the electronic imaging apparatus M so that the power receiving unit E30 is not received the braking force of the braking component 12 of the electronic imaging apparatus M during the rotating process.

The force applied to the braking force engagement member by the pressing portion E34 causes the braking force engagement member to move in a direction away from the photosensitive drum 1 (that is, in a direction closed to the braking member 16) along the rotation axis L1 of the driving unit 10.

The force applied by the pressing portion E34 to the braking force engagement member is directed toward the braking force engagement member along the rotation axis L2 of the power receiving unit E30.

The power receiving unit E30 is not received the braking force while receiving the driving force, so the processing cartridge 100 may be received a greater driving force when the electronic imaging apparatus M is working, and the operation of the processing cartridge 100 is more stable and the working state is better.

Preferably, along the rotation axis L2 of the power receiving unit E30, the height of the driving force receiving portion E33 is greater than the height of the pressing portion E34. This can save materials, reduce production costs, and avoid excessive pressing, minimize pressing force, reduce friction loss, and improve the stability of the combination.

Preferably, along the radial direction of the power receiving unit E30, the driving force receiving portion E33 is farther from the rotation axis L2 of the power receiving unit E30 than the pressing portion E34. This further reduces the overall volume of the pressing portion E34, reduces production costs, and improves the rigidity of the pressing portion E34. In addition, this structural arrangement can prevent the pressing portion E34 from pressing the driving member 14, thereby improving the stability of the combination of the power receiving unit and the driving unit.

Preferably, the positioned portion E32 is located at the middle end of the main body portion E31 and is used to engage with a positioning column 153 (see FIG. 1) of a driving member of the electronic imaging apparatus M. The structure is simple and easy to process.

Preferably, a protrusion structure E35 extending along the rotation axis L2 of the power receiving unit E30 is provided on the main body portion E31. Along the rotation direction E01 when the power receiving unit E30 is working, the driving force receiving portion E33 is located on the upstream side of the protrusion structure E35. A guided surface E36 is provided on the top of the protrusion structure E35, and the guided surface E36 is inclined relative to the normal plane of the rotation axis L2 of the power receiving unit E30. Along the rotation direction E01 when the power receiving unit E30 is working, the guided surface E36 is located on the upstream side higher than the downstream side. In order to reduce the resistance of the power receiving unit E30 to be mounted into the driving unit 10, when the processing cartridge 100 is mounted into the electronic imaging apparatus M, it is convenient to quickly separate the driving protrusion 15 and the second braking force engagement member 19 to improve the smoothness of the installation of the processing cartridge 100.

Preferably, the angle between the plane where the guided surface E36 is located and the normal plane of the rotation axis L2 is between 40 degrees and 70 degrees, thereby further reducing the installation resistance.

Preferably, the power receiving unit E30 is provided with a pair of protrusion structures E35 that are rotationally symmetrical arrangement with respect to the rotation axis L2 of the power receiving unit E30. The driving force receiving portion E33 is located on one side of the protrusion structure E35 along the circumference of the power receiving unit E30. Preferably, along the radial direction of the power receiving unit E30, the protrusion structure E35 is configured with a uniform wall thickness. This is convenient for simplifying the processing technology and reducing production costs. Preferably, the pressing portion E34 is a cylindrical boss. The structure is simple, the mold is simplified, and the production cost is reduced. The shape of the cylindrical boss enables the pressing portion E34 to obtain an annular pressing working surface, which reduces the axial sliding amount of the braking force engagement component and improves the smoothness of the engagement.

Compared with embodiment 1, this embodiment eliminates the guided surface 36, and can also functions to press the first braking force engagement member 18, so that the first engaging portion 183 and the second engaging portion 193 are pressed by the pressing portion E34 and move in the direction of the rotation axis L1 of the driving unit 10 away from the photosensitive drum 1 (that is, in the direction closed to the braking member 16), and the braking force transmission part 173 is disengaged from the braking force receiving protrusion 195 along the direction of the rotation axis L1, and the braking force on the second braking force engagement member 19 is unloaded.

The developing cartridge with the above structure includes a power receiving unit B30 with a simpler structure and a simplified structure.

Preferably, when the power receiving unit E30 is working, along the direction of the rotation axis L2 of the power receiving unit E30, the side of the pressing portion E34 away from the photosensitive drum 1 is abutted the side of the braking force engaging member close to the photosensitive drum 1. In this embodiment, the side of the pressing portion E34 away from the photosensitive drum 1 is abutted the side of the first braking force engagement member 18 close to the photosensitive drum 1.

Preferably, the driving force receiving portion E33 is perpendicular to the normal plane of the rotation axis L2 of the power receiving unit E30.

Obviously, the protrusion structures E35 do not need to be configured to a pair, and only one protrusion structure E35 may be provided.

Embodiment 6

The present embodiment is an improvement on the embodiment 5, and the relevant description part refers to the drawings and explanations in the embodiment 5. The shape and structure of the processing cartridge 100 (not shown in the figure) of the present embodiment are basically the same as those of the processing cartridge 100 of the embodiment 5, and the main difference is that the structure of the power receiving unit F30 is different.

Figure 19:
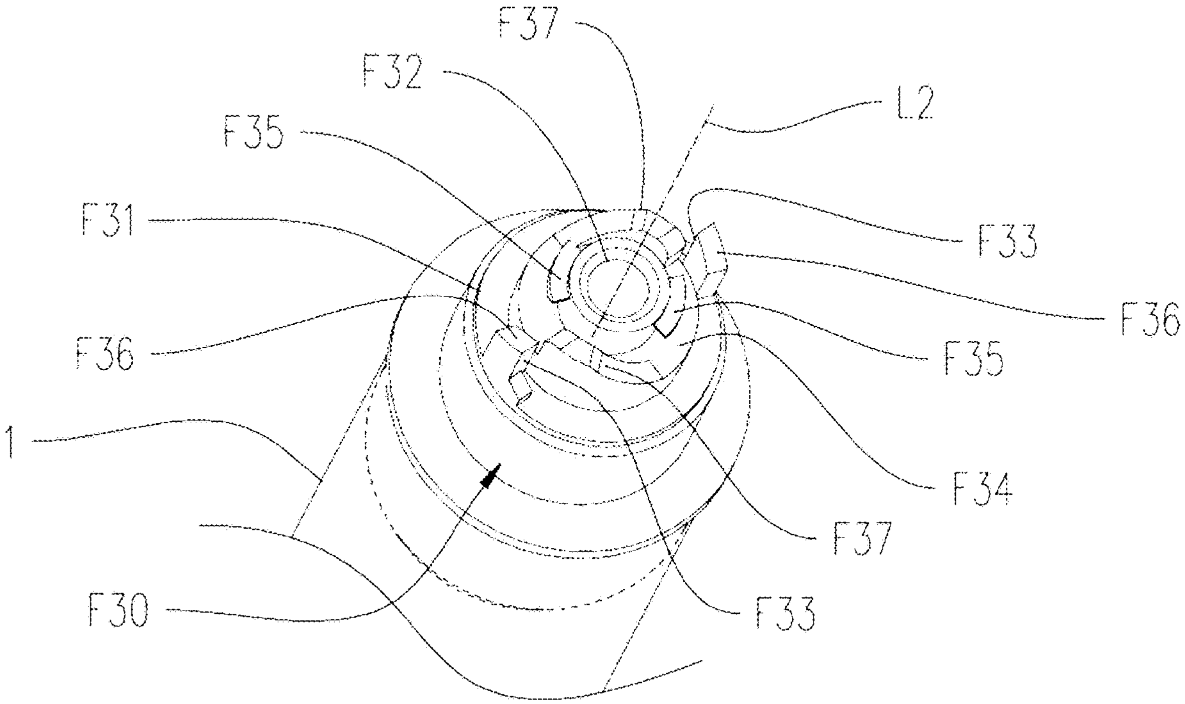
FIG. 19 is a schematic view of the power receiving unit according to embodiment 6 of the present disclosure.

As illustrated in FIG. 19, the power receiving unit F30 is added a guide portion F37 relative to the power receiving unit E30.

Preferably, the guided portion F37 is arranged on the main body portion F31 and extends along the rotation axis L2 of the power receiving unit F30, along the circumference of the power receiving unit F30, the side of the guided portion F37 close to the driving force receiving portion F33 is configured with a greater height in the direction of the rotation axis L2 of the power receiving unit F30 than the side of the guided portion F37 far from the driving force receiving portion. The first braking force engagement member 18 is quickly dislocated with the driving protrusion 15 at the guided portion F37, thereby improving the efficiency of the power receiving unit F30 being mounted in the driving unit 10.

Preferably, along the radial direction of the power receiving unit F30, the guided portion F37 is configured with a uniform wall thickness. This is beneficial to simplifying the mold and reducing production costs. Preferably, along the circumferential direction of the power receiving unit F30, the driving force receiving portion F33 is adjacent to the guided portion F37. This is beneficial to effectively separating the driving protrusion 15 and the second braking force engagement member 19, and facilitates the driving protrusion 15 to quickly and accurately dock with the driving force receiving portion F33.

Obviously, along the rotation axis L2 of the power receiving unit F30, the height trends of the top surfaces of the guided surface F36 and the guided portion F37 are opposite, that is, the guided surface F36 and the guided portion F37 is configured with guiding trends in opposite directions.

Preferably, when the power receiving unit F30 is working, along the direction of the rotation axis L2 of the power receiving unit F30, the side of the pressing portion F34 away from the photosensitive drum 1 is abutted the side of the braking force engagement member close to the photosensitive drum 1. In this embodiment, the side of the pressing portion F34 away from the photosensitive drum 1 is abutted the side of the first braking force engagement member 18 close to the photosensitive drum 1.

A pair of visors F35 rotationally symmetrical arrangement with respect to the rotation axis L2 of the power receiving unit F30 are provided on the positioned portion F32. In some mounted states, the visors F35 may be abutted the braking force engagement member to facilitate adjustment of the relative position of the driving force receiving portion F33 and the driving member 14. Specifically, along the rotation direction of the power receiving unit F30, the visors F35 is located between the two driving force receiving portions F33.

Obviously, the protrusion structures do not need to be configured to a pair, and only one protrusion structure may be provided.

Embodiment 7

The present embodiment is an improvement on the embodiment 6, and the relevant description part refers to the drawings and explanations in the embodiment 6. The shape and structure of the processing cartridge 100 (not shown in the figure) of the present embodiment are basically the same as those of the processing cartridge 100 of the embodiment 6, and the main difference is that the structure of the power receiving unit G30 is different.

Figure 20:
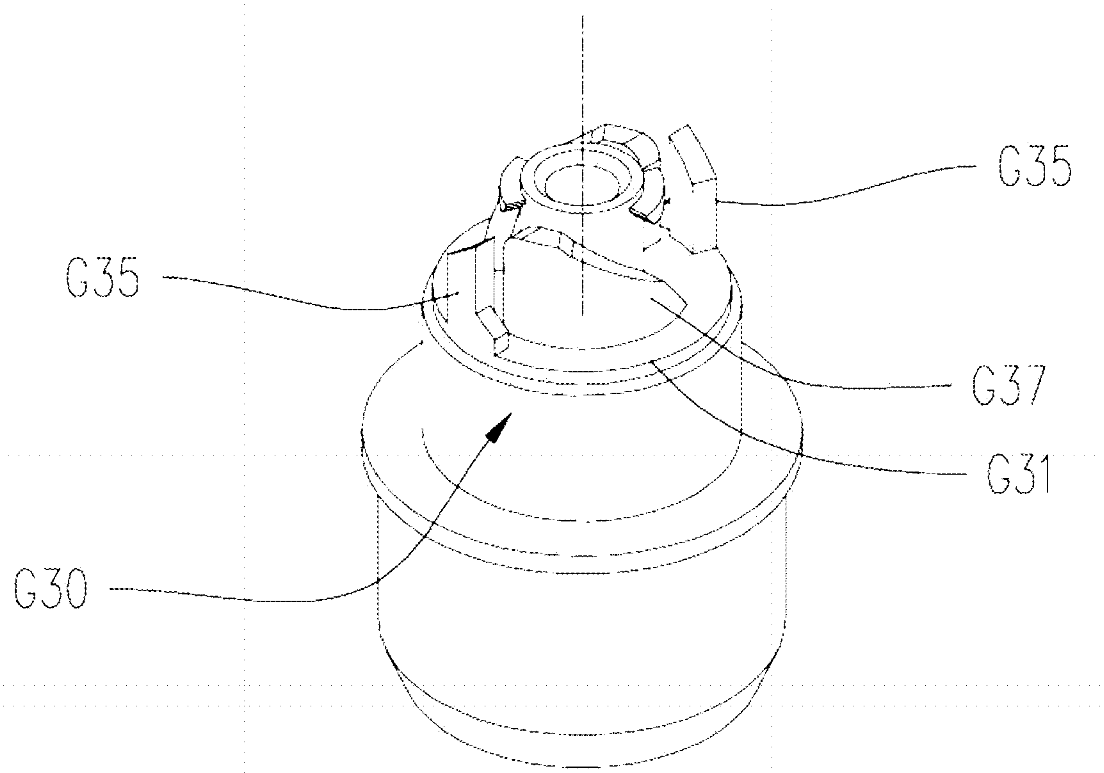
FIG. 20 is a schematic view of the power receiving unit according to embodiment 7 of the present disclosure.

As illustrated in FIG. 20, the power receiving unit G30 only be removed the pressing portion F34 compared to the power receiving unit F30, and the guided part G37 is directly arranged on the main body portion G31. Preferably, the guided part G37 and the main body portion G31 are integrally injection molded to reduce materials, simplify molds and reduce production costs.

Obviously, the protrusion structures G35 do not need to be configured to a pair, and only one protrusion structure G35 may be provided.

Embodiment 8

The present embodiment is an improvement on the embodiment 6, and the relevant description part refers to the drawings and explanations in the embodiment 6. The shape and structure of the processing cartridge 100 (not shown in the figure) of the present embodiment are basically the same as those of the processing cartridge 100 of the embodiment 6, and the main difference is that the structure of the power receiving unit H30 is different.

Figure 21:
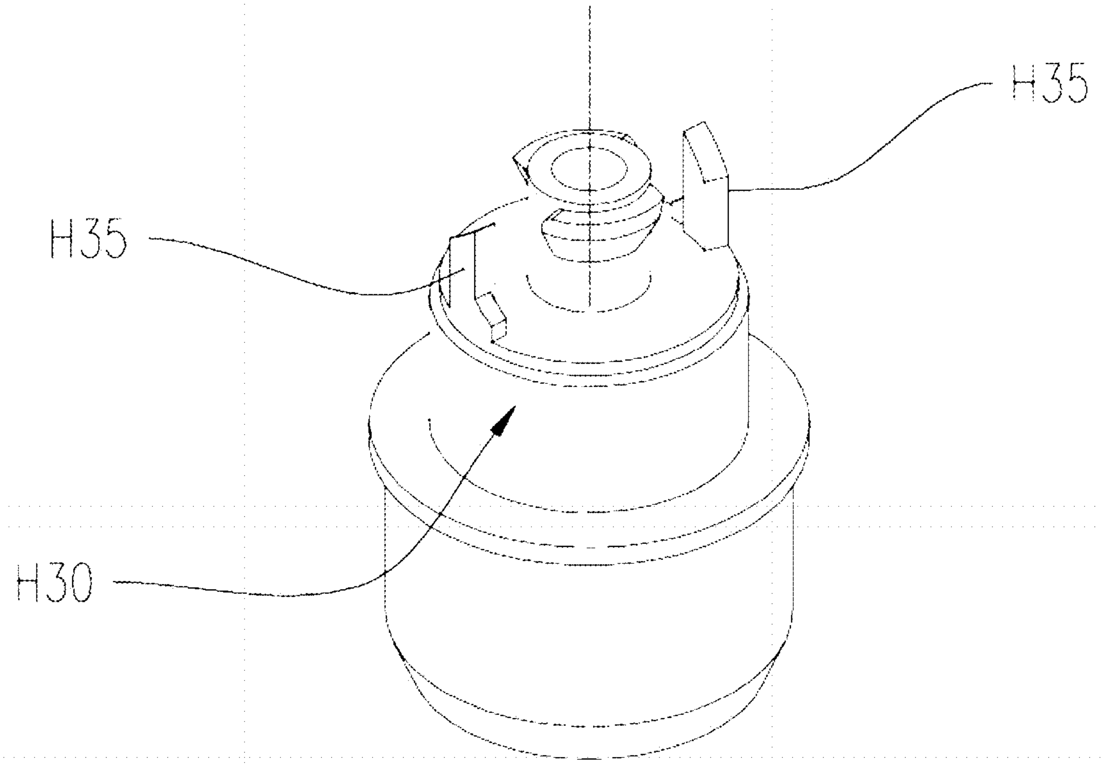
FIG. 21 is a schematic view of the power receiving unit according to embodiment 8 of the present disclosure.

As illustrated in FIG. 21, the power receiving unit H30 only be removed the pressing portion F34 and the guided portion F37 compared to the power receiving unit F30, thereby further reducing materials, simplifying molds, and lowering production costs.

Embodiment 9

The present embodiment is an improvement on the embodiment 5, and the relevant description part refers to the drawings and explanations in the embodiment 5. The shape and structure of the processing cartridge 100 (not shown in the figure) of the present embodiment are basically the same as those of the processing cartridge 100 of the embodiment 5, and the main difference is that the structure of the power receiving unit L30 is different.

Figure 22:
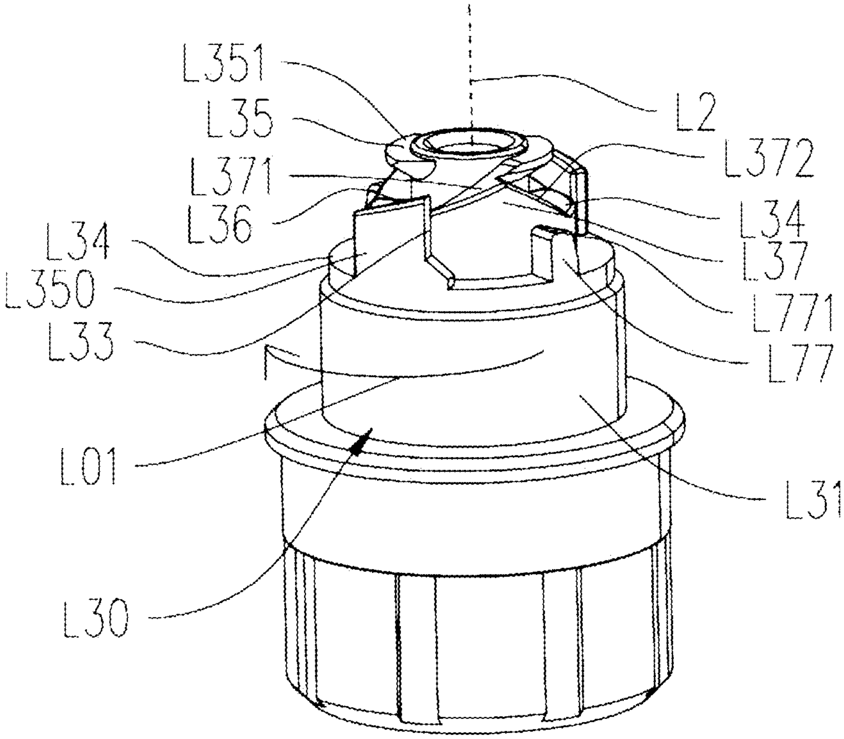
FIG. 22 is a schematic view of the power receiving unit according to embodiment 9 of the present disclosure.
Figure 23:
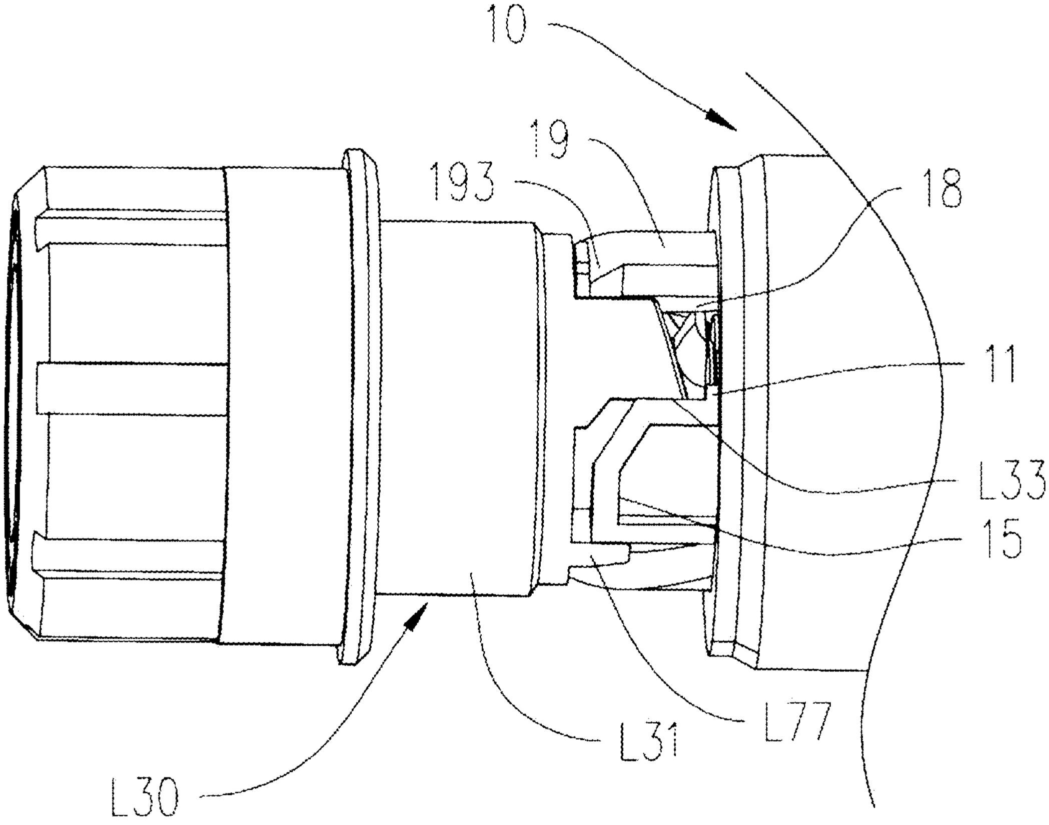
FIG. 23 is a schematic view of a structure after engaging the power receiving unit and the driving unit according to embodiment 9 of the present disclosure.

As illustrated in FIG. 22 and FIG. 23, The power receiving unit L30 is mainly added a guided portion L37 and a stop portion L77 relative to the power receiving unit E30. The guided portion L37 is arranged on the main body portion L31 and extends along the rotation axis L2 of the power receiving unit L30. With measuring along the axis L2 of the power receiving unit L30, the guided portion L37 is farther away from the main body portion L31/photosensitive drum 1 than the pressing portion L34. The guided portion L37 is configured with a first inclined surface L371 and a second inclined surface L372 inclined relative to the normal plane of the rotation axis L2, wherein the first inclined surface L371 is used to guide the first braking force engagement member 18 and/or the second braking force engagement member 19, so that the first engaging portion 183 and/or the second engaging portion 193 are separated from the driving protrusion 15, thereby improving the efficiency of the power receiving unit L30 being mounted in the driving unit 10. The second inclined surface L372 is used to guide the first braking force engagement member 18 and/or the second braking force engagement member 19 so that the first braking force engagement member 18 and/or the second braking force engagement member 19 may be moved to the first inclined surface L371.

The first inclined surface L371 and the second inclined surface L372 are connected to each other. When the imaging device is working, along the rotation direction L01 of the power receiving unit L30, the first inclined surface L371 and the second inclined surface L372 are oriented in opposite directions. The first inclined surface L371 is oriented toward the downstream side of the rotation direction L01 relative to the second inclined surface L372, and the second inclined surface L372 is oriented toward the upstream side of the rotation direction L01 relative to the first inclined surface L371. Preferably, when the imaging device is working, along the rotation direction L01 of the power receiving unit L30, the upstream end of the first inclined surface L371 is connected to the surface of the visor L35, and the downstream end extends to connect with the pressing portion L34; the downstream end of the second inclined surface L372 is connected to the first inclined surface L371, and the upstream end is connected to another pressing portion L34.

The power receiving unit L30 is further configured with a protrusion structure L350. When the imaging device is working, along the rotation direction L01 of the power receiving unit L30, the protrusion structure L350 is located on the downstream side of the guided portion L37, and the driving force receiving portion L33 is located on the upstream side of the protrusion structure L350 and arranged in a straight surface. The guided surface L36 is arranged at the top of the protrusion structure L350, and the guided surface L36 is arranged to be inclined relative to the normal plane of the rotation axis L02 and its direction is the same as the direction of the first inclined surface L371, so that the first engaging portion 183 and/or the second engaging portion 193 may be separated from the driving protrusion 15 in the rotation direction of the driving unit 10, so as to achieve rapid and accurate docking of the driving protrusion 15 with the driving force receiving portion L33.

Preferably, along the rotation axis direction of the power receiving unit L30, the top surface L351 of the visor L35 is farther away from the main body portion L31/photosensitive drum 1 than the guided surface L36. In the process of the power receiving unit L30 engaging with the driving unit 10, the visor L35 is configured to contact the drive unit 10 before the guided surface L36, thereby preventing the power receiving unit L30 from being incorrectly docked with the driving unit 10. For example, in the process of the power receiving unit L30 engaging with the driving unit 10, the second engaging portion 193 first is abutted the visor L35, but the engagement is not completed at this time. As the driving unit 10 is rotated, the second engaging portion 193 is guided by the first inclined surface L371 and the guided surface L36 in sequence, and finally the first engaging portion 183 and/or the second engaging portion 193 are separated from the driving protrusion 15 in the rotation direction of the driving unit 10, thereby realizing the rapid and accurate docking of the driving protrusion 15 with the driving force receiving portion L33.

Preferably, the driving force receiving portion L33 is disposed adjacent to the guided portion L37, which is beneficial to effectively separating the driving protrusion 15 from the second engaging portion 193 and facilitates rapid and accurate docking of the driving protrusion 15 with the driving force receiving portion L33.

Furthermore, when the driving unit is stopped rotating, the power receiving unit L30 will usually continue to rotate a certain angle due to inertia, thereby causing unnecessary rotation of the photosensitive drum 1, and the photosensitive drum 1 may be attached with excess toner, affecting the printing quality. To solve the above problem, the power receiving unit L30 of this embodiment is further provided with a stop portion L77, which is used to abut the driving protrusion 15 when the driving component 11 is stopped rotating, so that the rotation of the power receiving unit L30 is suppressed. When the imaging device is working, the stop portion L77 and the driving force receiving portion L33 are arranged at intervals in the rotation direction L01, and the stop portion L77 is located on the upstream side of the driving force receiving portion L33. A space that can accommodate the driving protrusion 15 is formed between the stop portion L77 and the driving force receiving portion L33, that is, when the power receiving unit F30 is mounted in the driving unit 10, the driving protrusion 15 is restricted between the stop portion L77 and the driving force receiving portion L33. With the driving force receiving unit F30 configured with the structure, when the driving component 11 is stopped rotating, the continued rotation of the power receiving unit L30 is suppressed due to the inertia, thereby reducing the possibility of excess toner being attached to the photosensitive drum 1, reducing the difficulty of cleaning, and improving the printing quality.

Preferably, along the direction of the rotation axis L02 of the power receiving unit L30, the distance from the end L771 of the stop portion L77 to the main body portion L31/photosensitive drum 1 is smaller than the distance from the guided surface L36 to the main body portion L31/photosensitive drum 1. In the power receiving unit L30 configured with the structure, the guided surface L36 is configured to contact the driving unit 10 before the stop portion L77, so that the first engaging portion 183 and/or the second engaging portion 193 are separated from the drive protrusion 15 in the rotation direction of the driving unit 10, and the stop portion L77 is combined with the drive protrusion 15, thereby preventing the power receiving unit L30 from being incorrectly combined with the driving unit 10, and realizing quick and accurate docking of the driving protrusion 15 with the driving force receiving portion L33.

Next, the engaging process and the working process of the power receiving unit L30 and the driving unit 10 will be described with reference to FIG. 22 and FIG. 23.

When the power receiving unit L30 is mounted at the first angle, the first engaging portion 183 and/or the second engaging portion 193 first is abutted the visor L35, at which time the power receiving unit L30 and the driving unit 10 cannot be combined into place; as the driving unit 10 is rotated, the first engaging portion 183 and/or the second engaging portion 193 are guided by the first inclined surface L371 and the guided surface L36 in turn, and finally the first engaging portion 183 and/or the second engaging portion 193 are separated from the driving protrusion 15 in the rotation direction of the driving unit 10, so that the driving protrusion 15 and the driving force receiving portion L33 are quickly and accurately connected, and the driving protrusion 15 is configured to enter the space formed by the stop portion L77 and the driving force receiving portion L33, and the stop portion L77 is combined with the driving protrusion 15.

When the power receiving unit L30 is mounted at another angle, the first engaging portion 183 and/or the second engaging portion 193 first is abutted against the first inclined surface L371. At this time, under the action of the elastic force of the second elastic member 102 and the first inclined surface L371, the first engaging portion 183 and/or the second engaging portion 193 is guided by the first inclined surface L371 and moves, and then under the guidance of the guide surface L36, the first engaging portion 183 and/or the second engaging portion 193 are completely separated from the driving protrusion 15, so that the driving protrusion 15 and the driving force receiving portion L33 can be quickly and accurately connected, and the driving protrusion 15 enters the space formed by the stop portion L77 and the driving force receiving portion L33, and the stop portion L77 is combined with the driving protrusion 15.

When the driving unit 10 is stopped rotating, the driving protrusion 15 is configured to stop moving, and the power receiving unit L30 continues to rotate due to inertia. At this time, since the stop portion L77 is combined with the driving protrusion 15, the rotation of the power receiving unit L30 is suppressed and the power receiving unit L30 is stopped rotating.

Embodiment 10

The present embodiment is an improvement on the embodiment 9, and the relevant description part refers to the drawings and explanations in the embodiment 9. The shape and structure of the processing cartridge 100 (not shown in the figure) of the present embodiment are basically the same as those of the processing cartridge 100 of the embodiment 9, and the main difference is that the structure of the power receiving unit M30 is different.

Figure 24:
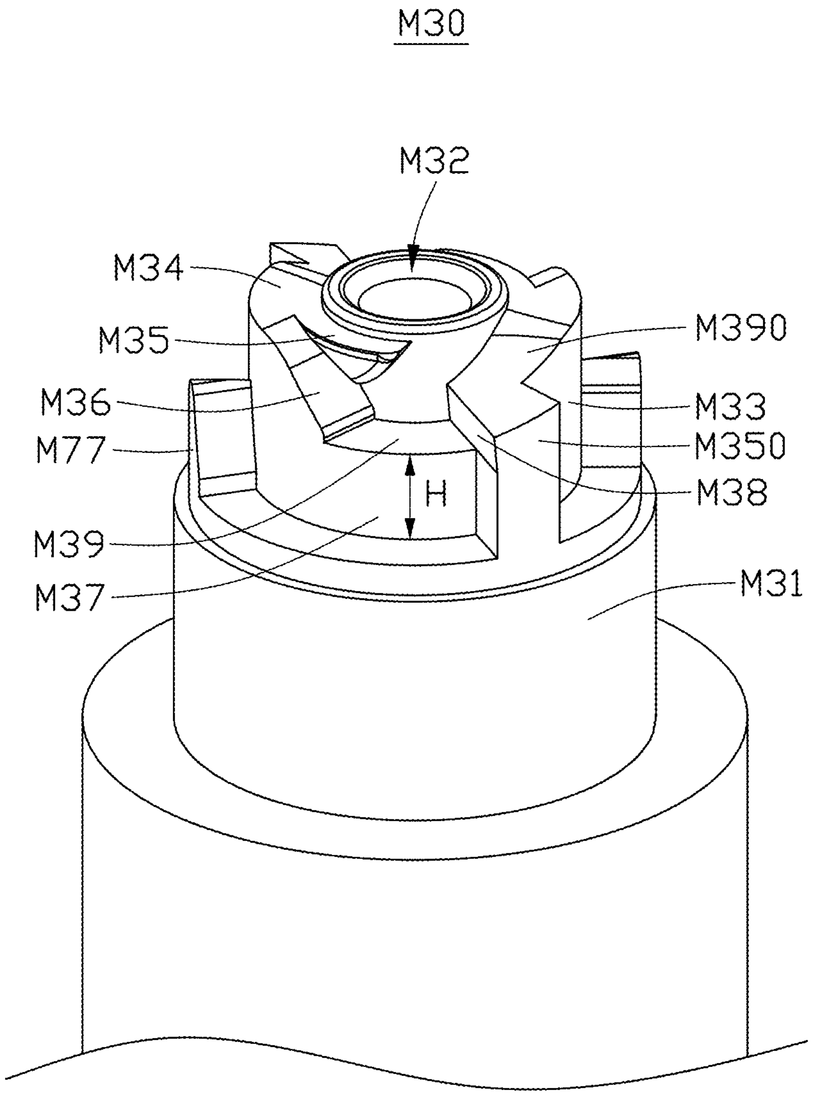
FIG. 24 is a schematic view of the power receiving unit according to embodiment 10 of the present disclosure.

As illustrated in FIG. 24, The power receiving unit M30 includes a stepped portion M37, a braking force receiving portion M38, a inclined portion M390 and a visor portion M35, wherein the stepped portion M37 is formed between the main body portion M31 and the notched portion M39, and the bottom surface of the stepped portion M37 and the bottom surface of the stop portion M77 are located on the same plane. The height H between the stepped portion M37 and the notched portion M39 is 2.6-3.2 mm. Within this range, when the first engaging portion 183 extends toward the notched portion M39, it just is abutted the end surface of the notched portion M39. In other words, the end surface of the first engaging portion 183 toward the notched portion M39 is defined as a first bottom surface 1831, and the first bottom surface 1831 and the notched portion M39 are both planes. When the first engaging portion 183 is rotated and extends in the direction of the notched portion M39, the first bottom surface 1831 is abutted the bottom surface of the notched portion M39, and at this time, the driving member 14 in the driving unit 10 is configured to complete the axial rotation and telescopic action. It can be understood that in other embodiments, the first bottom surface 1831 and the notched portion M39 may be other shapes as long as they may fit and abut each other.

The height H of the stepped portion M37 is corresponded to the distance h formed between the protrusion portion 175 and the first flange portion 181. In other words, the height error of the stepped portion M367 is exactly equal to h, so that within this error range, the first bottom surface 1831 may completely be abutted the notched portion M39.

The two sides of the notched portion M39 include a guided surface M36 and a braking force receiving portion M38, and the guided surface M36 and the braking force receiving portion M38 are arranged opposite to each other, and the arrangement between the braking force receiving portion M38 and the notched portion M39 is close to vertical. When the first braking force engagement member 18 rotates toward the notched portion M30, the first engaging portion 183 and the braking force engaging portion M38 are configured to contact each other, and at this time, the first engaging portion 183 is reached the rotation end position. Since the first engaging portion 183 extends outward from the first flange portion 181 along the rotation axis L1 to form a hook shape, the contact space between the first engaging portion 183 and the braking force receiving portion M38 is a contact point and is not a contact surface. In other words, the first engaging portion 183 extends and protrudes toward the braking force receiving portion M38, and the first inclined surface 1832 gradually inclines and moves away from the rotation axis L1 from the end close to the inclined surface M390 toward the end away from the inclined surface M390, and one end of the first inclined surface 1832 intersects with the first bottom surface 1831 to form an intersection, and when the first engaging portion 183 is located in the notched portion M39, the intersection is in contact with the braking force receiving portion M38.

A visor portion M35 is formed on the outer periphery of the guided surface M36 near the positioned portion M32, and the visor portion M35 is used to prevent the protruding portion of the driving unit 10 from entering in the axial direction. In this embodiment, the width of the visor portion M35 in the direction perpendicular to the rotation axis L2 is smaller than the width of the notched portion M39, so that the first engaging portion 183 may be smoothly pushed to abut the bottom surface of the notched portion M39, and when the first engaging portion 183 is pushed to abut the notched portion M39, the inner side wall of the first engaging portion 183 and the outer side wall of the visor portion M35 is abutted each other, thereby ensuring that the first engaging portion 183 is stably positioned in the notched portion M39.

Figure 25:
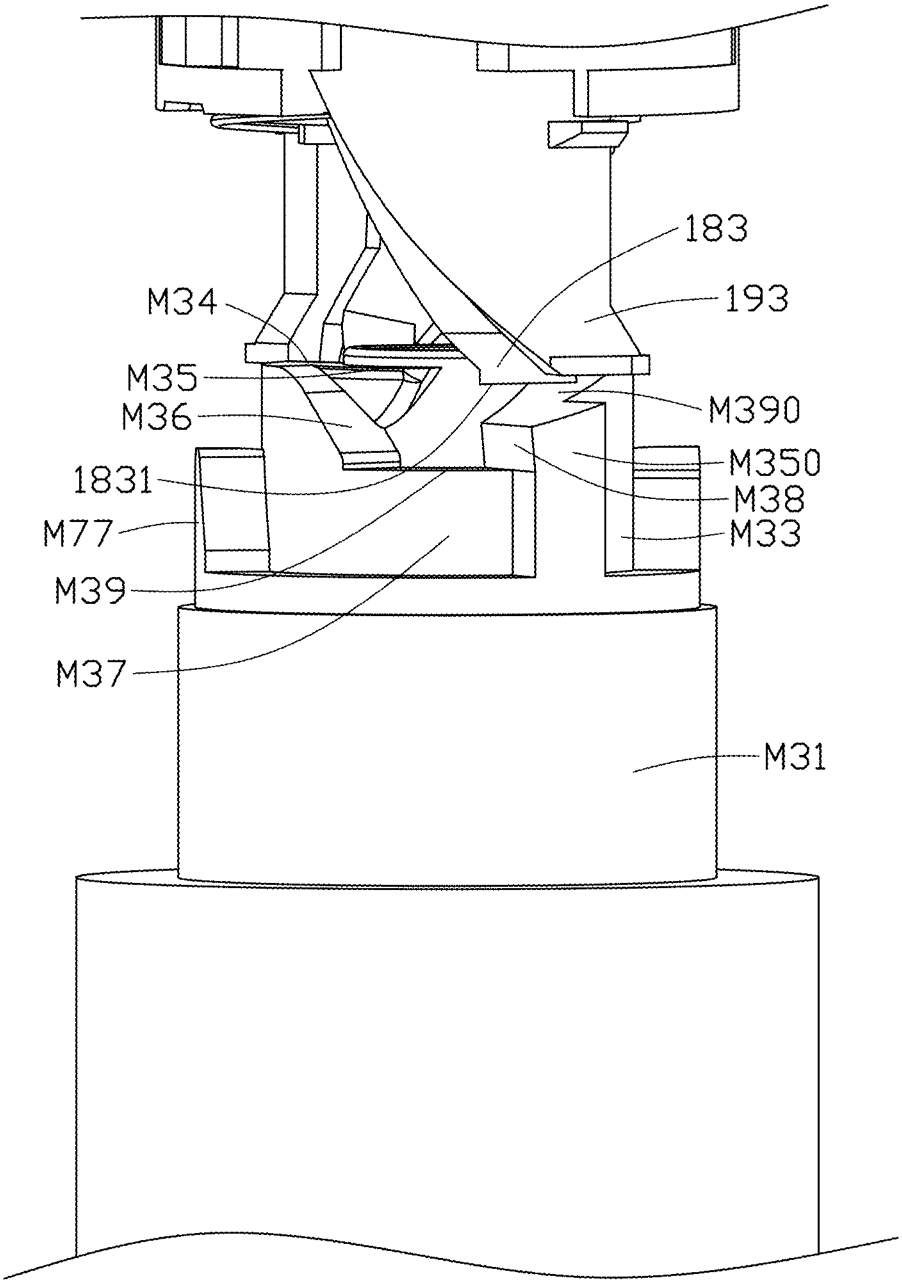
FIG. 25 is a diagram of an initial state of the power receiving unit and the driving unit in FIG. 24 after assembly.

An inclined portion M390 is formed on the upper side between the braking force receiving portion M38 and the driving force receiving portion M33, and the inclined portion M390 is fixedly connected to the pressing portion M34 and is located on one side of the pressing portion M34, and gradually inclines from one end close to the pressing portion M34 toward one end of the main body portion M31. Referring to FIG. 25, in the initial state, the inclined portion M390 is opposite to and in contact with the approaching first engaging portion 183, and the driving unit 10 and the power receiving unit M30 are relatively close to each other until they are in contact with each other.

Figure 26:
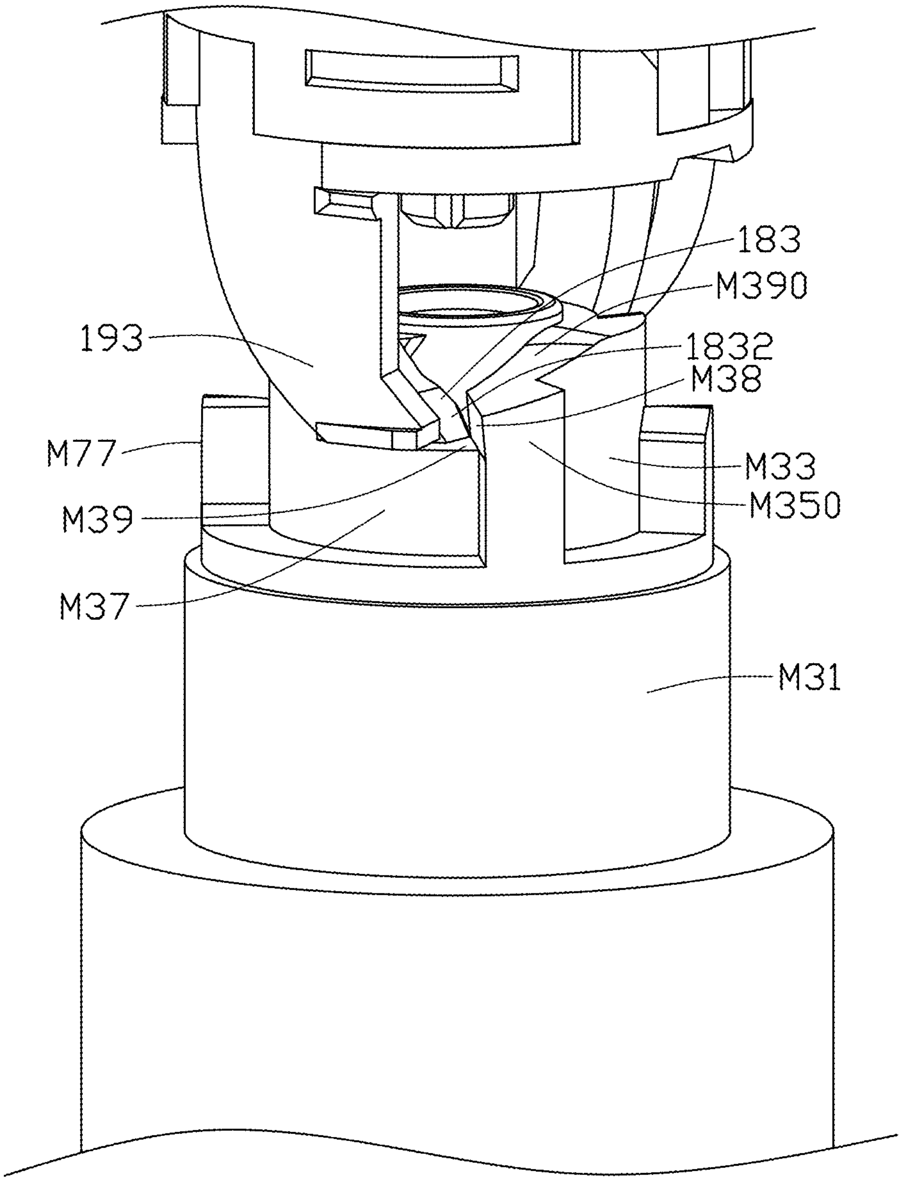
FIG. 26 is a diagram of a state where the power receiving unit in FIG. 24 is engaged with the driving unit.

Referring to FIG. 26, when the driving member 14 starts to rotate, under the action of the elastic force of the second elastic member 102 and the inclined portion M390, the driving force transmission surface 151 of the driving protrusion 15 engages with the driving force receiving portion M33 of the power receiving unit M30 and drives the power receiving unit M30 to rotate. At the same time, the first engaging portion 183 and/or the second engaging portion 193 are pushed to rotate and extend along the inclined surface structure of the inclined portion M390 toward the guide surface M36, and then the first engaging portion 183 and/or the second engaging portion 193 are completely separated from the driving protrusion 15, and the first engaging portion 183 is pushed to abut the bottom surface of the notched portion M39, and at the same time, the first engaging portion 183 and the braking force engaging portion M38 are in contact with each other, and the inner side wall of the first engaging portion 183 and the outer side wall of the visor portion M35 are in contact with each other, and the driving protrusion 15 is configured to enter the space formed by the stop portion L77 and the driving force receiving portion M33, and the stop portion L77 is combined with the driving protrusion 15.

What is claimed is:

1. A power receiving unit configured for cooperating with a driving unit generating a driving force of an electronic imaging apparatus to transmit a power to rotate a photosensitive drum of the electronic imaging apparatus, the driving unit including a driving component and a braking force component arranged side by side along a same axis, the power receiving unit comprising:

a mounting portion, configured for mounting the power receiving unit on an end of the photosensitive drum of the electronic imaging apparatus, the power receiving unit is further configured to be coaxially engaged with the driving component, and driven by the driving component to drive the photosensitive drum to rotate, such that the driving component is moved along the axis, and the power receiving unit further including:

applying the driving force to a surface of the photosensitive drum, the power receiving unit is restricted from rotating when the driving force surface is abutted the braking force component, the braking force component is used to provide a force opposite to the driving force to the power receiving unit, the power receiving unit is further configured to engage with a braking force engagement member of the braking force component and the driving component;

the power receiving unit further including:

a main body portion and a pressing portion, wherein the main body portion is mounted on an end of the photosensitive drum, the pressing portion protrudes from one end of the main body portion away from the photosensitive drum and is in contact with the braking force engagement member; when the power receiving unit is rotating, the power receiving unit is pressured by the braking force engagement member and does not receive a braking force of the braking force component of the electronic imaging apparatus, a force applied by the pressing portion to the braking force engagement member is configured to cause the braking force engagement member to move along a rotation axis of the driving unit in a direction away from the photosensitive drum.

2. The power receiving unit according to claim 1, further comprising a driving force receiving portion configured for engaging the driving component and receiving a driving force, the driving force receiving portion is mounted on one side of the pressing portion, along the direction of the axis, an end surface of the main body portion away from the photosensitive drum is defined as a reference plane, a height of the driving force receiving portion, measured from the reference plane, is greater than a height of the pressing portion, measured from the reference plane.

3. The power receiving unit according to claim 1, wherein, along a direction perpendicular to the axis, the driving force receiving portion is farther from the rotation axis of the power receiving unit than the pressing portion.

4. The power receiving unit according to claim 1, wherein, a protrusion structure is located on one side of the driving force receiving portion, and along the rotation direction of the power receiving unit during operation, the driving force receiving portion is located on the upstream side of the protrusion structure, a guided surface is provided on the top of the protrusion structure; the guided surface is inclined relative to the rotation axis of the power receiving unit, along the rotation direction of the power receiving unit during operation, the side of the guided surface located upstream is higher than the side of the guided surface located downstream.

5. The power receiving unit according to claim 4, wherein, the power receiving unit further including a guided portion, which is arranged on the main body portion and extends along the rotation axis of the power receiving unit; along the circumference of the power receiving unit, the side of the guided portion close to the driving force receiving portion is configured with a greater height in the direction of the rotation axis of the power receiving unit than the side of the guided portion away from the driving force receiving portion.

6. The power receiving unit according to claim 5, wherein, the guided portion is configured with a uniform wall thickness along a radial direction of the power receiving unit.

7. The power receiving unit according to claim 5, wherein, the driving force receiving portion is adjacent to the guided portion along the circumferential direction of the power receiving unit.

8. The power receiving unit according to claim 4, wherein, the main body portion is provided with a protrusion structure extending along the rotation axis of the power receiving unit, and a guided surface is disposed on the top of the protrusion structure;

the angle between the plane where the guided surface is located and the normal plane of the rotation axis of the power receiving unit is between 40 degrees and 70 degrees.

9. The power receiving unit according to claim 4, wherein, the power receiving unit further including a stop portion, and the stop portion is disposed at intervals from the driving force receiving portion in a rotation direction of the power receiving unit.

10. The power receiving unit according to claim 9, wherein,

Along the rotation axis direction of the power receiving unit, a distance from an end of the stop portion to the photosensitive drum is smaller than a distance from the guided surface to the photosensitive drum.

11. The power receiving unit according to claim 4, wherein, the power receiving unit further including a visor abutted the braking force engagement member, the visor extending from one end of the guided surface around the rotation axis, the driving force receiving portion is configured with two, and the visor is located between the two driving force receiving portion along the rotation direction of the power receiving unit.

12. The power receiving unit according to claim 11, wherein, along the rotation axis direction of the power receiving unit, the top surface of the visor is farther from the photosensitive drum than the guided surface.

13. The power receiving unit according to claim 11, wherein, a braking force receiving portion is formed on the opposite side of the guided surface, and the braking force receiving portion and the guided surface is configured to together constitute a notched portion for accommodating and abutting the bottom surface of the braking force engagement member.

14. The power receiving unit according to claim 13, wherein, a stepped portion is protruded between the main body portion and the notched portion, and the stepped portion is configured to be close to the braking force engagement member so that a bottom surface of the braking force engagement member and an end surface of the notched portion are abutted each other, the height of the stepped portion along the direction of the rotation axis is 2.6 mm to 3.2 mm.

15. The power receiving unit according to claim 14, wherein, the driving component including a braking transmission member for transmitting a braking force, wherein the braking transmission member is inserted into the braking force engagement member and may be engaged with the braking force engagement member to rotate synchronously or separated from each other to interrupt the braking force, the braking transmission member is configured with a protrusion portion protruding in the direction of the pressing portion, and the protrusion portion is configured to define the height difference of the stepped portion.

16. The power receiving unit according to claim 13, wherein the end surface of the braking force engagement member close to the braking force receiving portion is an inclined structure, and the inclined structure is inclined from the end close to the rotation axis toward the direction away from the rotation axis, the bottom of the braking force engaging member is formed a first bottom surface, the inclined structure and the first bottom surface of the braking force engaging member is formed a first intersection, and the first intersection is configured to in contact with the braking force receiving portion.

17. A power receiving unit for mounting on the end of a photosensitive drum, the power receiving unit is configured with a main body portion and a driving force receiving portion arranged on the main body portion, wherein the driving force receiving part is used to receive the driving force from a driving component of a driving unit of an electronic imaging apparatus, and the power receiving unit further including:

a pressing portion arranged on the main body portion, for applying a force to a braking force engaging member of the driving unit of the electronic imaging apparatus so that the power receiving unit is not received a braking force of a braking component of the electronic imaging apparatus during a rotation process, the braking force engaging member of the driving component is formed a first bottom surface near the end of the photosensitive drum, and the extension direction of the first bottom surface is perpendicular to the rotation direction, the power receiving unit is formed a notched portion corresponding to the first bottom surface, and the notched portion is abutted the first bottom surface.

18. A processing cartridge detachably mounted to a master component of an electronic imaging apparatus, the master component including a driving component and a braking component, the braking component including a braking force engaging member, and the processing cartridge includes:

a cartridge body;

a photosensitive drum, rotatably supported on the cartridge body;

a power receiving unit, arranged on one end of the photosensitive drum; wherein, the power receiving unit includes a driving force receiving portion and a pressing portion, the pressing portion is configured to apply a force to the braking force engaging member so that the power receiving unit is not received a braking force during rotation.

19. The processing cartridge according to claim 18, wherein, the power receiving unit including a main body portion which is cylindrical and a positioned portion arranged on the main body portion, the driving force receiving portion and the pressing portion are arranged outside the circumference of the positioned portion, and the pressing portion is used to press the braking force engaging member so that the braking force engaging member is moved in the direction of the rotation axis of the driving unit.

20. The processing cartridge according to claim 19, wherein, a guide surface is further provided on one side of a protrusion structure.

* * * * *